US009210743B2

(12) United States Patent
Ando et al.

(10) Patent No.: US 9,210,743 B2
(45) Date of Patent: Dec. 8, 2015

(54) LIGHTING DEVICE, LIGHTING FIXTURE, LAMP, AND SOUND EMISSION PREVENTION METHOD

(71) Applicant: Panasonic Corporation, Osaka (JP)

(72) Inventors: Tamotsu Ando, Osaka (JP); Tatsumi Setomoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 290 days.

(21) Appl. No.: 13/957,780

(22) Filed: Aug. 2, 2013

(65) Prior Publication Data

US 2014/0035486 A1    Feb. 6, 2014

(30) Foreign Application Priority Data

Aug. 6, 2012   (JP) .................................. 2012-174428

(51) Int. Cl.
| | |
|---|---|
| H05B 37/02 | (2006.01) |
| H05B 39/04 | (2006.01) |
| H05B 33/08 | (2006.01) |

(52) U.S. Cl.
CPC ............ *H05B 33/08* (2013.01); *H05B 33/0815* (2013.01); *H05B 33/0848* (2013.01); *Y02B 20/346* (2013.01)

(58) Field of Classification Search
CPC ................................. H05B 37/02; H05B 39/04
See application file for complete search history.

(56) References Cited

U.S. PATENT DOCUMENTS

| | | | |
|---|---|---|---|
| 8,193,739 B2 | 6/2012 | Kimura | |
| 8,878,448 B2 * | 11/2014 | Duan | ................. H05B 33/0815 315/219 |
| 2008/0136389 A1 | 6/2008 | Uchimoto et al. | |
| 2010/0052552 A1 | 3/2010 | Kimura | |
| 2012/0120342 A1 | 5/2012 | Uchimoto et al. | |

FOREIGN PATENT DOCUMENTS

| | | |
|---|---|---|
| EP | 0617501 A1 | 9/1994 |
| JP | 2010-062184 | 3/2010 |
| JP | 2010-212103 | 9/2010 |
| JP | 4653782 | 12/2010 |
| JP | 2011-103326 | 5/2011 |

OTHER PUBLICATIONS

European Search Report for corresponding European Application No. 13179044.6, dated Dec. 12, 2013.

* cited by examiner

*Primary Examiner* — Hai L Nguyen
(74) *Attorney, Agent, or Firm* — Renner, Otto, Boisselle & Sklar, LLP

(57) ABSTRACT

A lighting device including: a lighting circuit; a drive circuit; a dimmer control circuit; and an LPF, the drive circuit for increasing on-time as a pulse height increases when an inputted PWM signal satisfies a first condition where a pulse height is greater than a first threshold and less than a second threshold greater than the first threshold, and making the on-time for which a switching element is on when the switching element turns on and off once in a burst period, constant in a second condition where the height pulse is greater than the second threshold, the LPF generating a smoothed PWM signal which has a first time period satisfying the first condition and a second time period satisfying the second condition in a signal interval indicating a duty ratio, and outputting the smoothed PWM signal to the drive circuit.

6 Claims, 18 Drawing Sheets

LIGHTING DEVICE, LIGHTING FIXTURE, LAMP, AND SOUND EMISSION PREVENTION METHOD

CROSS REFERENCE TO RELATED APPLICATION

The present application is based on and claims priority of Japanese Patent Application No. 2012-174428 filed on Aug. 6, 2012. The entire disclosure of the above-identified application, including the specification, drawings and claims is incorporated herein by reference in its entirety.

FIELD

The present invention relates to a lighting device for turning on a solid state light-emitting device at brightness according to a dimming signal, a lighting fixture and a lamp which include the lighting device, and a sound emission prevention method for the lighting device.

BACKGROUND

In recent years, lighting fixtures using solid state light-emitting devices such as light-emitting diodes (LED) and organic electroluminescence (EL) elements are becoming popular as long-life lighting fixtures having low power consumption. For such lighting fixtures, lighting devices are developed which adjust the brightness of the solid state light-emitting device, by controlling a drive circuit of a DC-DC converter by using a pulse width modulation (PWM) signal, the duty ratio of which changes according to a dimming signal.

In the lighting device which performs dimmer control on the solid state light-emitting device according to a PWM signal, the PWM signal is a signal of audio frequency band (for example, 1 KHz). Thus, a choke coil included in the DC-DC converter emits a sound, and the sound is undesirably heard by a user.

Thus, conventionally, a circuit for preventing such sound emission from a lighting device has been proposed (for example, see PTL 1).

PTL 1 discloses a sound emission prevention circuit of a lighting system which performs dimmer control using a PWM signal. The sound emission prevention circuit includes an input terminal for inputting a PWM signal for the dimmer control, and a conversion circuit which converts the inputted PWM signal into a signal at a level dependent on the duty ratio of the PWM signal. According to the configuration, by converting the PWM signal into a DC voltage dependent on the duty ratio of the PWM signal, the PWM signal at audio frequency is not supplied to a drive circuit of the DC-DC converter, thereby preventing the sound emission from a choke coil.

CITATION LIST

Patent Literature

[PTL 1] Japanese Unexamined Patent Application Publication No. 2010-212103

SUMMARY

Technical Problem

However, in the conventional circuit which converts the PWM signal into the DC voltage and supplies the DC voltage to the drive circuit, although the sound emission is prevented, brightness of the solid state light-emitting device depends heavily on variations in power supply voltage.

FIG. 12 is a graph showing power supply voltage dependency of a lighting device using a conventional sound emission prevention circuit. Here, shown is a plot of results of measuring the brightness of the solid state light-emitting device (here, LED) dimmed using a PWM signal having a plurality of duty ratios (100%, 68.8%, 29.8%) when a voltage of an AC power source supplied to the lighting device is varied. Specifically, the voltage (a relative value where 100% represents a voltage under normal conditions) of the AC power source is indicated on the horizontal axis, and the brightness (a relative value where 100% represents the luminance when the power supply voltage and the duty ratio of the PWM signal are 100%) of an LED is indicated on the vertical axis.

As can be seen from the measurement result shown in FIG. 12, in the conventional sound emission prevention circuit, the brightness of the LED depends heavily on variations in the power supply voltage (i.e., the power supply voltage dependence is great). In particular, when the duty ratio of the PWM signal is small, even slight variations in the power supply voltage cause great variations in the brightness of the LED. For that reason, in such a conventional circuit, for example, the voltage of the mains supply decreases in a household when refrigerator compressors start. As a result, the brightness of LED reduces, ending up causing a person discomfort.

Thus, the present invention is made in view of the above problems and has an object to provide a lighting device which performs dimmer control on a solid state light-emitting device according to a PWM signal, and has low power supply voltage dependence and suppressed sound emission as compared to conventional.

Solution to Problem

To achieve the above object, the lighting device according to one embodiment of the present invention is a lighting device for turning on a solid state light-emitting device at brightness according to a dimming signal, the lighting device including: a lighting circuit to which a direct-current (DC) voltage is inputted, including a coil for chopping the inputted DC voltage and a diode for regenerating energy stored in the coil; a drive circuit including an input terminal to which a pulse width modulation (PWM) signal is inputted, and a switching element for turning on and off a current flowing through the coil by repeatedly turning on and off in a burst period which is a period corresponding to a duty ratio indicated by the PWM signal inputted to the input terminal; a dimmer control circuit for generating a PWM signal which has a duty ratio corresponding to the dimming signal; and a low pass filter for smoothing the PWM signal generated by the dimmer control circuit, and outputting the smoothed PWM signal to the input terminal of the drive circuit, wherein the PWM signal generated by the dimmer control circuit has a pulse height including a first threshold and a second threshold greater than the first threshold, the smoothed PWM signal includes a first time period in which the pulse height is greater than the first threshold and less than the second threshold, and a second time period in which the pulse height is greater than or equal to the second threshold, and the drive circuit increases on-time as the pulse height of the smoothed PWM signal increases in the first time period, and makes the on-time constant in the second time period, the on-time being a period for which the switching element is on when the switching element turns on and off once in the burst period.

Herein, the PWM signal may include a first logical state indicative of a Low state and a second logical state indicative of a High state, and is repeated at a constant frequency, and the smoothed PWM signal may have the second time period ⅓ or longer than a time period for which the second logical state continues.

Moreover, the drive circuit may turn the switching element on and off so that an envelope of a waveform of the current flowing through the coil in the burst period forms a shape corresponding to a waveform of the smoothed PWM signal inputted to the input terminal.

Moreover, the present invention can be implemented not only in a lighting device but also in a lighting fixture which includes the above-described lighting device, or a lamp which includes a solid state light-emitting device and the lighting device for turning on the solid state light-emitting device.

Moreover, the present invention can be implemented in a lighting fixture which includes the above-described lamp.

Furthermore, the present invention may be implemented in a sound emission prevention method for use in a lighting device for performing dimmer control on a solid state light-emitting device according to a PWM signal, the sound emission prevention method including determining a time constant for a low pass filter which smoothes the PWM signal, wherein when the time constant is determined, a first characteristic which is a relationship between the time constant and magnitude of sound emission is determined, a second characteristic which is a relationship between the time constant and power supply voltage dependence of the lighting device is determined, and a time constant is determined in which the magnitude of the sound emission is less than specified magnitude in the first characteristic and the power supply voltage dependence is less than a specified power supply voltage dependence in the second characteristic.

Advantageous Effects

According to the present invention, the lighting device which performs dimmer control on the solid state light-emitting device according to the PWM signal, and has low power supply voltage dependence and suppressed sound emission as compared to conventional, is achieved.

Thus, the present invention has significant practical value for its application today where the lighting fixtures employing long-line solid state light-emitting devices having low power consumption are used.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

Hereinafter, an embodiment of a lighting device, the lighting fixture, and a sound emission prevention method according to the present invention will be described, with reference to the accompanying drawings. It should be noted that an embodiment and modifications thereof described below are each merely an illustration of the present disclosure. Values, shapes, materials, components, disposition or a form of connection between the components, operation timings, and steps are merely illustrative, and are not intended to limit the present disclosure. The present disclosure is indicated by the appended claims. Moreover, among components of the below embodiment and modifications thereof, components not set forth in the independent claims indicating the top level concept of the present disclosure are will be described as optional components.

Lighting Device

First, an embodiment of a lighting device according to the present invention will be described.

Figure 1:
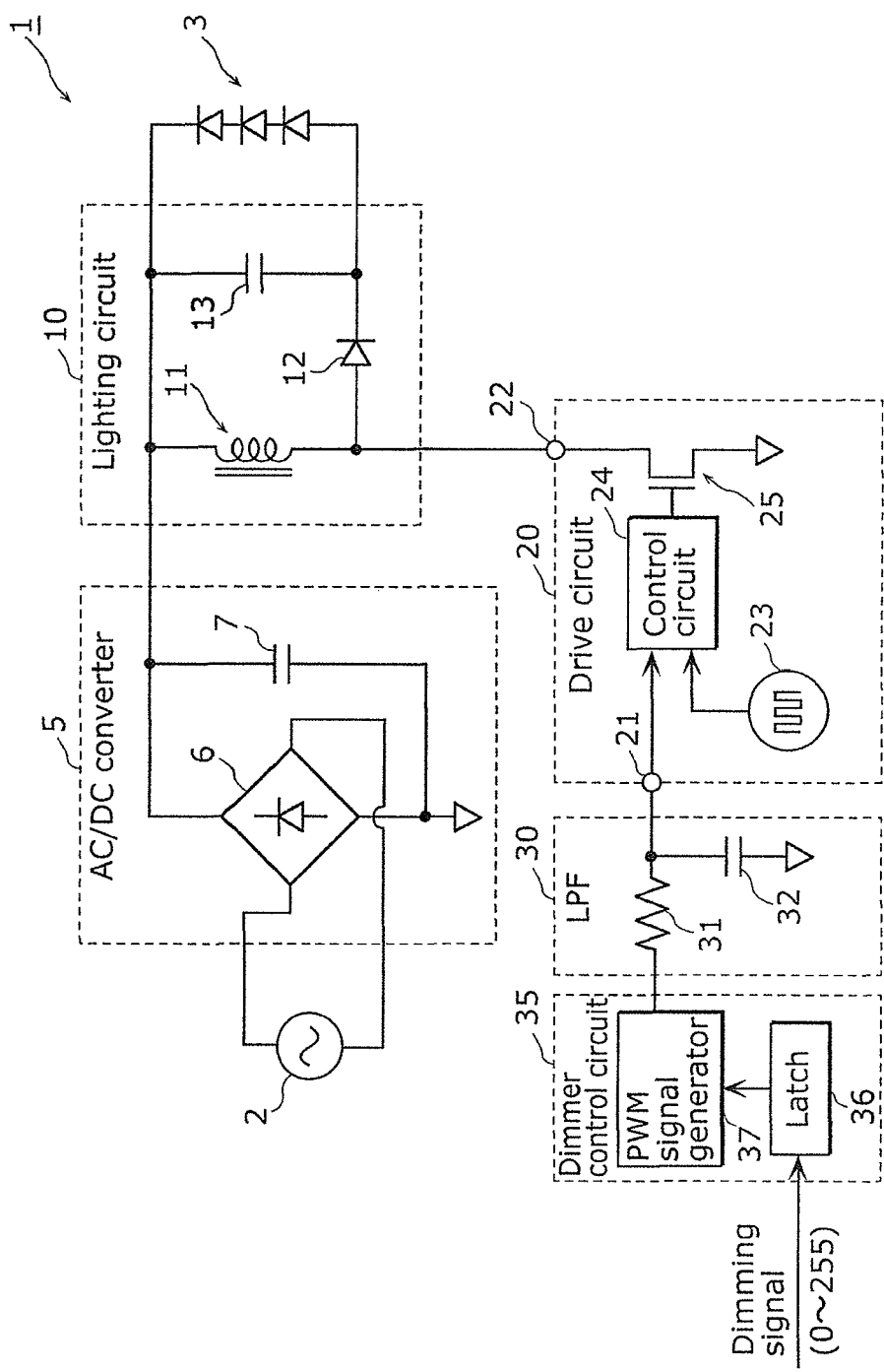
FIG. 1 is a circuit diagram of a lighting device according to an embodiment of the present invention.

FIG. 1 is a circuit diagram of a lighting device 1 according to an embodiment of the present invention. The figure also shows an AC power source 2 which supplies an AC voltage to the lighting device 1, and a solid state light-emitting device (here, LEDs 3) to be turned on.

The lighting device 1 is a circuit which turns on the solid state light-emitting device (here, the LEDs 3) at brightness according to a dimming signal inputted from outside. The lighting device 1 includes an AC/DC converter 5, a lighting circuit 10, a drive circuit 20, an LPF 30 and a dimmer control circuit 35.

The AC/DC converter 5 is a circuit which rectifies and smoothes an AC voltage from the AC power source 2 such as mains supply, and converts the obtained voltage into a DC voltage. The AC/DC converter 5 includes a diode bridge 6 and a capacitor 7. Specifically, the AC power source 2 is connected to the diode bridge 6 across AC input terminals, and the smoothing capacitor 7 is connected to the diode bridge 6 across DC input terminals.

The lighting circuit 10 is a circuit which generates a current to be supplied to the LEDs 3, using the DC voltage from the AC/DC converter 5 as input. In the present embodiment, the lighting circuit 10 is included as part of a chopper circuit serving as a DC-DC converter. Specifically, the lighting circuit 10 includes a choke coil for chopping the inputted DC voltage, a diode 12 for regenerating energy stored in the choke coil 11, and a smoothing capacitor 13. The choke coil 11, the diode 12, and the LEDs 3 are connected to form a circuit loop. The capacitor 13 is connected to the LEDs 3 in parallel and smoothes an output voltage (and an output current) of the lighting circuit 10.

The drive circuit 20 is a circuit which drives a current to be passed through the choke coil 11. The drive circuit 20 includes an input terminal 21, an output terminal 22, an oscillator 23, a control circuit 24, and a switching element 25. The input terminal 21 is a terminal to which a PWM signal is inputted. The oscillator 23 is a high-frequency clock oscillator for generating a burst pulse which turns the switching element 25 on, and generates, for example, clock signals having 50 KHz. The control circuit 24 passes a portion of the clock signals from the oscillator 23, using, as a gate signal, the PWM signal inputted to the input terminal 21, and outputs the passed clock signals (burst pulse) as a control signal to a control terminal of the switching element 25. The switching element 25 is a MOSFET or the like, and closes and opens (turns on and off) between the output terminal 22 and the ground, based on the control signal outputted from the control circuit 24. The output terminal 22 is a terminal from which an output signal from the drive circuit 20 is outputted to the lighting circuit 10, and, here, connected to a terminal of the switching element 25 (for example, a drain of an NMOS transistor). The switching element 25, and the choke coil 11 and the diode 12 included in the lighting circuit 10 form the DC-DC converter (specifically, the chopper circuit).

Due to such a configuration of the drive circuit 20, the switching element 25 repeatedly turns on and off in a burst period, which is a period corresponding to the duty ratio indicated by the PWM signal inputted from the input terminal 21, thereby turning on and off the current flowing through the choke coil 11.

The dimmer control circuit 35 is a circuit which generates the PWM signal having the duty ratio corresponding to the dimming signal inputted from outside. The dimmer control circuit 35 includes a latch 36 and a PWM signal generator 37. The dimming signal is a signal indicative of the brightness of the LEDs 3, and is, for example, 8-bit data indicating any integer value from 0 to 255 in the present embodiment. The latch 36 holds the dimming signal (for example, 8-bit data) inputted from outside. The PWM signal generator 37, each time new data is held in the latch 36, generates a PWM signal that has a duty ratio corresponding to a value indicated by the data held in the latch 36. For example, when the dimming signal indicates "0", the PWM signal generator 37 generates the PWM signal that has a duty ratio of 0%, and when the dimming signal indicates "255", generates the PWM signal that has a duty ratio of 100%.

The LPF 30 is a low pass filter which smoothes the PWM signal generated by the dimmer control circuit 35, and outputs the PWM signal to the input terminal 21 of the drive circuit 20. In the present embodiment, the LPF 30 is a 1st order low pass filter which includes a resistance 31 and a capacitor 32.

The lighting device 1 according to the present embodiment configured as described above has the following distinct features.

Figure 2:
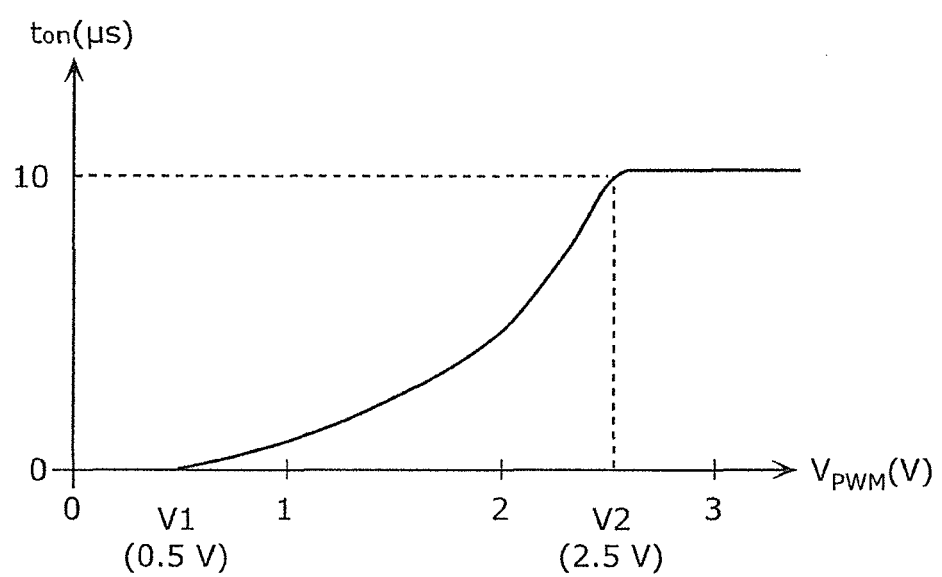
FIG. 2 is a diagram showing on-time characteristics of a drive circuit included in the lighting device.

The control circuit 24 included in the drive circuit 20 generates, depending on the pulse height of the inputted PWM signal from the input terminal 21, a pulse which has a pulse width corresponding to on-time (the vertical axis) shown in FIG. 2, and outputs the pulse to the switching element 25. FIG. 2 is a diagram showing on-time characteristics of the drive circuit 20 where the pulse height ($V_{PWM}$ (V)) of the inputted PWM signal is indicated on the horizontal axis and on-time ($t_{on}$ (µs)) of the switching element 25 is indicated on the vertical axis. It should be noted that on-time ($t_{on}$) is a period for which the switching element 25 is on when the switching element 25 turns on and off once in the burst period.

As can be seen from FIG. 2, when the pulse height of the inputted PWM signal is less than or equal to a first threshold V1 (here, 0.5 V), the control circuit 24 does not generate the pulse signal. When the pulse height of the inputted PWM signal is greater than the first threshold V1 and less than a second threshold V2 (>the first threshold V1, here, 2.5 V) the control circuit 24 generates a pulse signal, the on-time (i.e., pulse width) of which increases as the pulse height of the PWM signal increases. Furthermore, when the pulse height of the inputted PWM signal is greater than or equal to the second threshold V2, the control circuit 24 generates a pulse signal which has a constant on-time (i.e., pulse width).

Due to such characteristics of the control circuit 24, the drive circuit 20 has the following characteristics. Specifically, when the pulse height of the PWM signal inputted from the input terminal 21 is greater than the first threshold V1 and less than the second threshold V2 (>the first threshold V1), the drive circuit 20 increases the on-time of the switching element as the pulse height of the PWM signal increases. When the pulse height of the PWM signal is greater than or equal to the second threshold V2, the drive circuit 20 makes the on-time of the switching element constant.

Then, the LPF 30 smoothes the PWM signal generated by the dimmer control circuit 35 to generate the smoothed PWM signal having the following waveform, and outputs the smoothed PWM signal to the drive circuit 20. Specifically, the smoothed PWM signal is a signal which has, in each signal interval indicative of the duty ratio, a first time period in which the pulse height is greater than the first threshold V1 and less than the second threshold V2, and a second time period in which the pulse height is greater than or equal to the second threshold V2.

In other words, the PWM signal generated by the dimmer control circuit 35 has a pulse height including a first threshold and a second threshold greater than the first threshold. The smoothed PWM signal includes a first time period in which the pulse height is greater than the first threshold and less than the second threshold, and a second time period in which the pulse height is greater than or equal to the second threshold. Here, the drive circuit 20 increases on-time as the pulse height of the smoothed PWM signal increases in the first time period, and makes the on-time constant in the second time period, the on-time being a period for which the switching element 25 is on when the switching element turns on and off once in the burst period.

More specifically, the dimmer control circuit 35 generates the PWM signal in which a signal including a first logical state (here, Low) and a second logical state (here, High) whose duration relative to the duration of the first logical state indicates the duty ratio in one period is repeated at a constant frequency (here, 600 Hz or a multiple thereof). Then, the LPF 30 generates the smoothed PWM signal in which the above described second time period is ⅓ times or longer, preferably, ½ times or longer than a time (i.e., the above-described signal interval) for which the second logical state (here, High) continues in the PWM signal generated by the dimmer control circuit 35. As can be seen from measurement data below, this achieves the lighting device 1 which has low power supply voltage dependence and suppressed sound emission as compared to conventional.

It should be noted that the PWM signal repetition frequency is 600 Hz or a multiple thereof to avoid various adverse effects caused by the mains supply. Specifically, 100 Hz or 120 Hz ripple can occur in the DC voltage generated by the AC/DC converter 5. Due to the interference by the ripple, load current flowing through the LEDs 3 varies, ending up causing a flicker in light which is output from the LEDs 3. Thus, the PWM signal repetition frequency is the least common multiple of a ripple frequency which may occur (100 Hz or 120 Hz) or a multiple thereof (600 Hz or a multiple thereof), thereby keeping the light output from the LEDs 3 substantially constant. Thus, the flicker due to the interference by the ripple is reduced.

Next, operation of the lighting device 1 according to the present embodiment configured as set forth above will be described.

Figure 3:
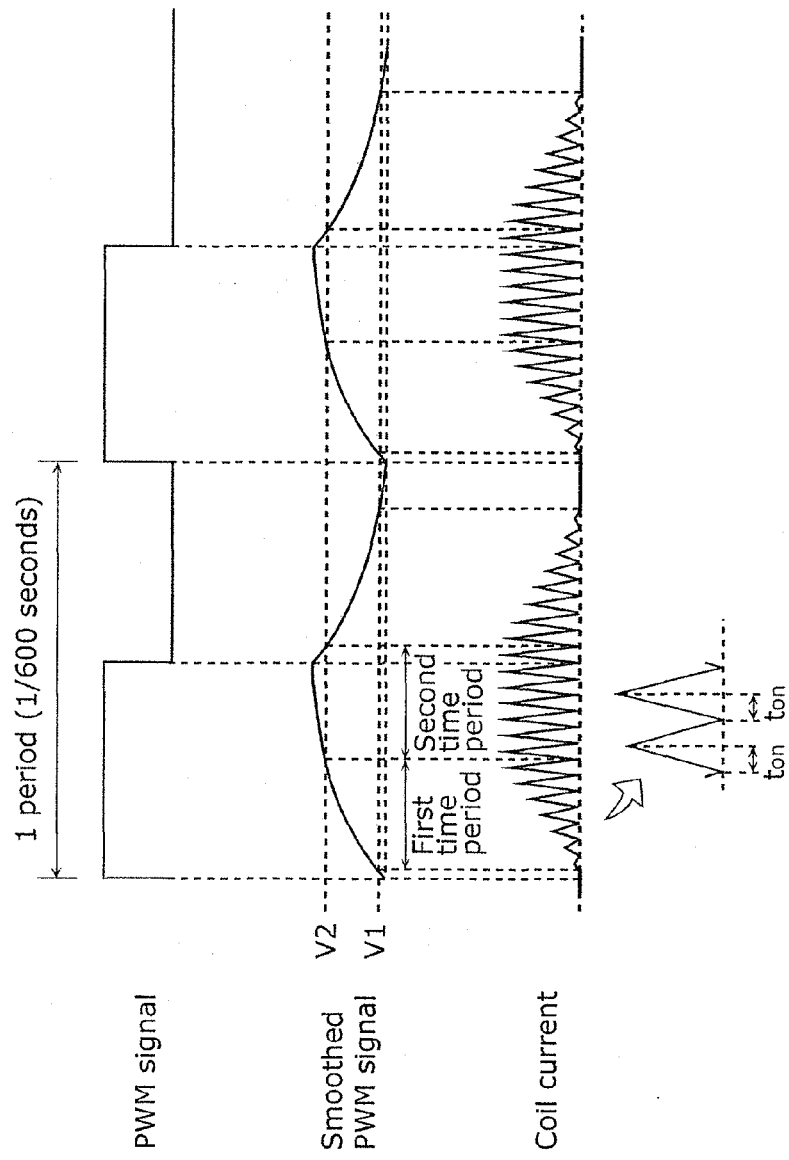
FIG. 3 is a timing diagram showing operation of the lighting device.

FIG. 3 is a timing diagram showing operation of the lighting device 1 according to the present embodiment. Shown here is "PWM signal" outputted from the dimmer control circuit 35, "Smoothed PWM signal" outputted from the LPF 30, and the waveform of a current ("Coil current") flowing through the choke coil 11.

The dimmer control circuit 35 generates the PWM signal which has the duty ratio corresponding to the dimming signal inputted from outside. The PWM signal includes, for each period, the second logical state (here, High), and the first logical state (here, Low). For example, once received the dimming signal indicative of "128", the dimmer control circuit 35 generates the PWM signal of 600 Hz having the duty ratio of 50% as shown in "PWM signal" of FIG. 3, and outputs the PWM signal to the LPF 30.

The LPF 30 smoothes the PWM signal outputted from the dimmer control circuit 35. As a result, a smoothed PWM signal is generated which has smooth slopes at the rising edge and falling edge of "PWM signal", as shown in "Smoothed PWM signal" of FIG. 3. The smoothed PWM signal has the first time period ("First time period" of FIG. 3) and the second time period ("Second time period" of FIG. 3) in each signal interval (here, including at least an interval where "PWM signal" is High) indicative of the duty ratio, as shown in "Smoothed PWM signal" of FIG. 3. The first time period is a period in which the pulse height of the smoothed PWM signal is greater than the first threshold V1 and less than the second threshold V2 in the on-time characteristics shown in FIG. 2. The second time period is a period in which the pulse height of the smoothed PWM signal is greater than or equal to the second threshold V2.

Once the smoothed PWM signal generated by the LPF 30 is inputted to the drive circuit 20, the drive circuit 20 pulses the current to be passed through the choke coil 11, according to the on-time characteristics shown in FIG. 2. As a result, when the pulse height of the inputted smoothed PWM signal is less than or equal to the first threshold V1, the switching element 25 turns off. When the pulse height of the inputted smoothed PWM signal is greater than the first threshold V1 and less than the second threshold V2 (>the first threshold V1), the switching element 25 performs the following burst driving. Specifically, the switching element 25 turns on and off at a constant high frequency (here, 50 KHz) in the burst period so that the on-time (here, zero to 10 μs) increases as the pulse height of the PWM signal increases. Furthermore, when the pulse height of the inputted smoothed PWM signal is greater than or equal to the second threshold V2, the switching element 25 repeatedly turns on for the constant on-time (here, 10 μs) and turns off, at a constant frequency (here, 50 KHz) in the burst period. It should be noted that when the switching element 25 turns off in the burst period, energy stored in the choke coil 11 flows as a regenerative current through the LEDs 3 via the diode 12.

Due to such operation of the drive circuit 20, a current having the waveform as shown in "Coil current" of FIG. 3 flows through the choke coil 11. An envelope (a line connecting the peaks) of "Coil current" has a waveform corresponding to the waveform of "Smoothed PWM signal". Specifically, "Coil current" has a rise period (corresponding to the above first time period) in which triangle waves continue the heights of which gradually increase, and a fall period in which triangle waves continue the heights of which gradually decrease. Furthermore, "Coil current" has, between the rise period and the fall period, a time period (a time period corresponding to the above second time period) where the height of triangle waves is constant.

In the present embodiment, to improve the power conversion efficiency (the power conversion efficiency as the DC-DC converter) in the lighting circuit 10, a current flowing through the choke coil 11 is driven in a critical mode as can be seen from the waveform of "Coil current" shown in FIG. 3. Specifically, in the burst period, at a moment when the current flowing through the choke coil 11 is zero (i.e., the regenerative current is zero), the switching element 25 turns on again and the current starts flowing through the choke coil 11. The on-time of the switching element 25 and inductances of the choke coil 11 are set to achieve such a critical mode.

In the present embodiment, since the lighting circuit 10 includes the capacitor 13, the current (i.e., DC current) obtained by smoothing "Coil current" of FIG. 3 is supplied to the LEDs 3. Thus, the LEDs 3 emit light at brightness according to a current corresponding to a mean value of "Coil current" of FIG. 3.

According to the above operation, the lighting device 1 according to the present embodiment dims the LEDs 3 at the brightness according to the dimming signal inputted from outside.

Figure 4:
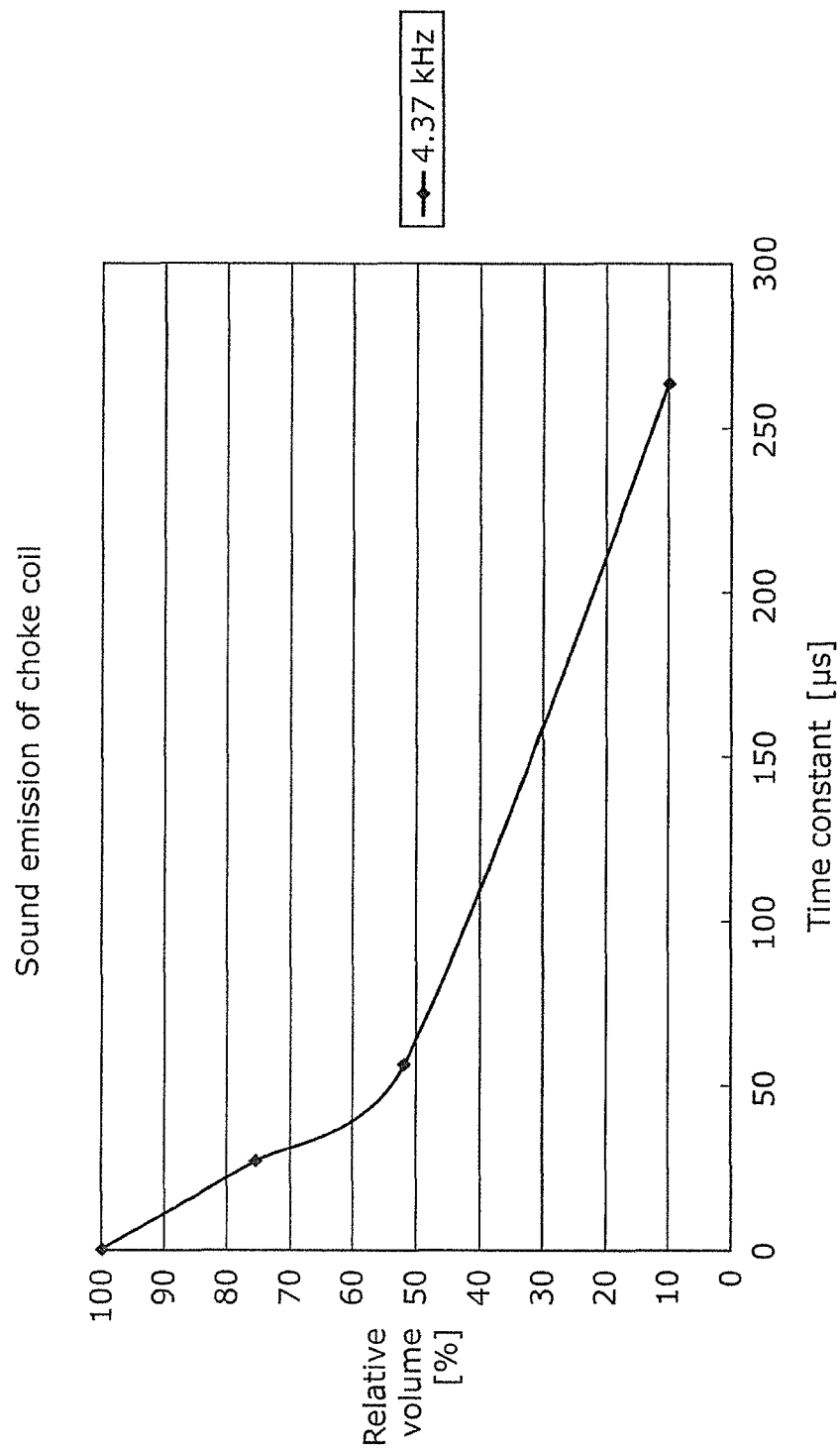
FIG. 4 is a diagram showing the magnitude of sound emission from the lighting device.

FIG. 4 is a diagram showing the magnitude of sound emission from the lighting device 1 according to the present embodiment. Here, in a state where the PWM signal having a constant duty ratio (for example, 50%) is being outputted from the dimmer control circuit 35, four values (zero, 26.4 μs, 56.4 μs, 264 μs) are set as the time constant of the LPF 30. Then, a result of measuring the volume of sound emission (here, volume at 4.37 KHz where a frequency component whose volume is the largest) from the choke coil 11 (here, a choke coil having 1.3 mH) at each set time constant is plotted. The time constant (μs) of the LPF 30 is indicated on the horizontal axis. The volume of sound emission (relative volume where 100% represents volume when the time constant is zero) is indicated on the vertical axis. It should be noted that in the present embodiment, the time constant of the LPF 30 is a product of the resistance value of the resistance 31 and the capacitance of the capacitor 32 included in the LPF 30.

According to experiment using a test subject, the volume of sound emission when the time constant is zero was sufficiently loud to be noticed by the test subject near (within about 3 m range of) the lighting device 1. The volume of sound emission when the time constant is 26.4 µs and greater was almost unnoticeable by the test subject nearby the lighting device 1. From the above, it can be seen that in the lighting device 1 according to the present embodiment, the volume of sound emission from the choke coil 11 can be reduced to a negligible level by setting the time constant of the LPF 30 to 26.4 µs or greater.

Figure 5A:
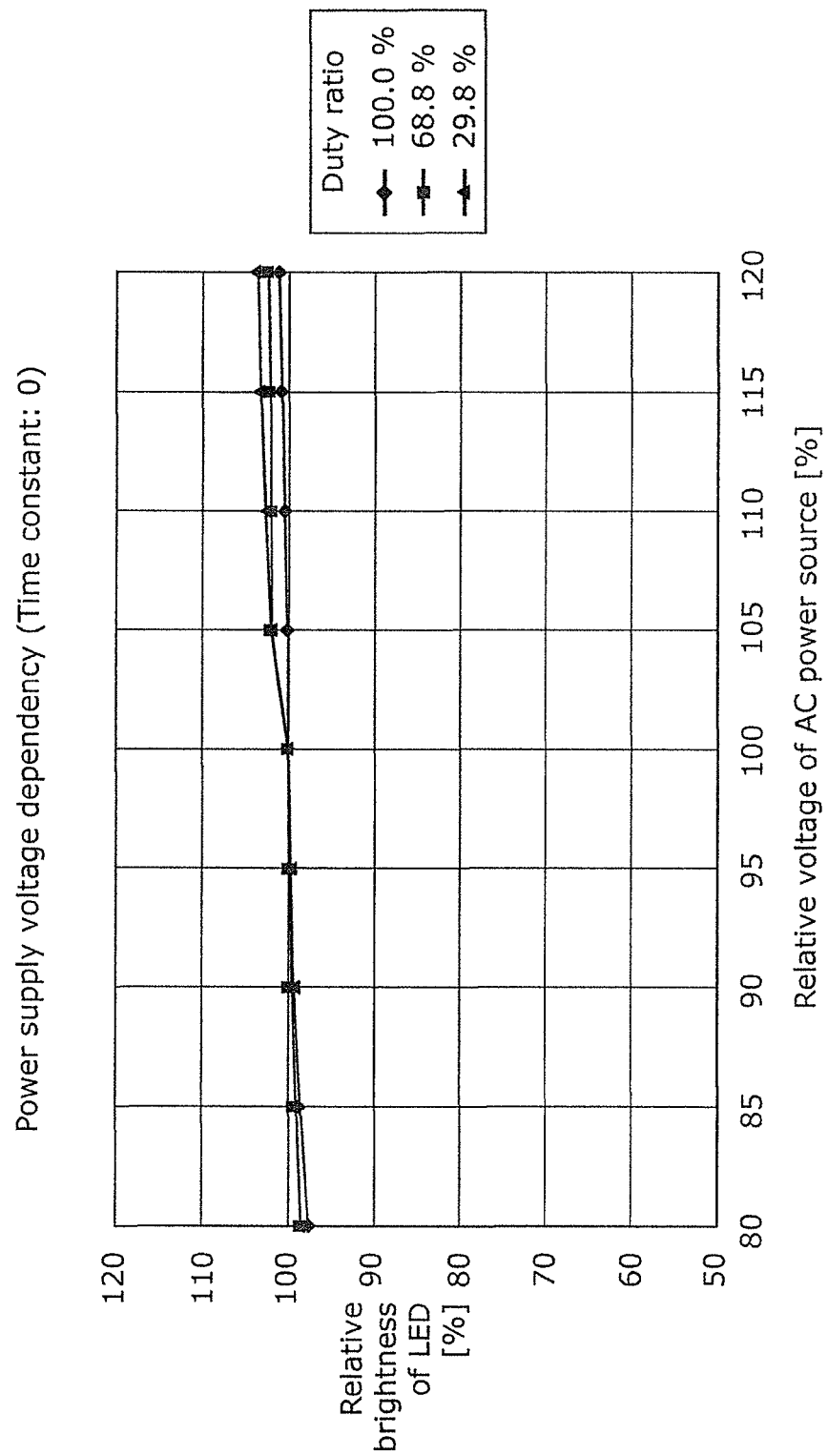
FIG. 5A is a diagram showing the power supply voltage dependency of the lighting device when the time constant of LPF is zero.

FIG. 5A is a diagram showing the power supply voltage dependency of the lighting device 1 when the time constant of the LPF 30 is zero in the present embodiment. Here, shown is a plot of results of measuring the brightness of the LEDs 3 dimmed using the PWM signal having a plurality of duty ratios (100%, 68.8%, 29.8%) when a voltage of an AC power source 2 is varied. The voltage (a relative value where 100% represents the voltage under normal conditions) of the AC power source 2 is indicated on the horizontal axis, and relative brightness (a relative value where 100% represents the vertical brightness of the LEDs when the relative voltage of the power supply and the duty ratio of the PWM signal are 100%) of the LEDs 3 is indicated on the vertical axis.

As can be seen from the measurement result shown in FIG. 5A, the lighting device 1 is largely independent of the power supply voltage when the time constant of the LPF 30 is zero. According to the experiment using the test subject, the test subject did not notice the changes in brightness of the LEDs 3 when the power supply voltage instantly varies by 5%.

Figure 5B:
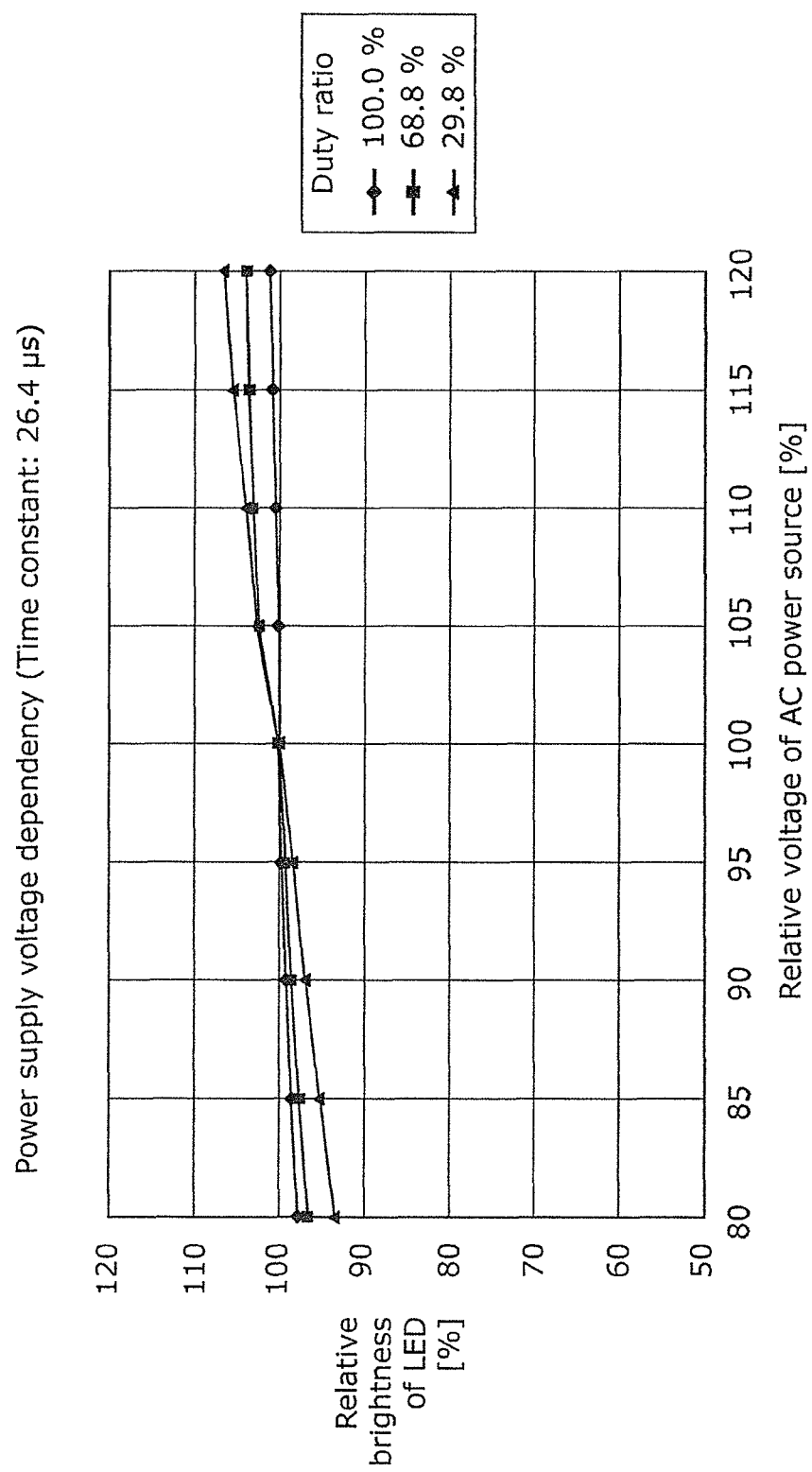
FIG. 5B is a diagram showing the power supply voltage dependency of the lighting device when the time constant of LPF is 264 µs.

FIG. 5B is a diagram showing the power supply voltage dependency of the lighting device 1 when the time constant of the LPF 30 is 26.4 µs in the present embodiment. The figure shows a result of measurement conducted under the same conditions as FIG. 5A, except that the time constant of the LPF 30 is different. As can be seen from the measurement result shown in FIG. 5B, when the time constant of the LPF 30 is 26.4 µs, the dependency of the illumination changes on the power supply voltage is small while the power supply voltage dependence is greater than the measurement result shown in FIG. 5A. According to the experiment using the test subject, the test subject did not notice the changes in brightness of the LEDs 3 even when the power supply voltage instantly varies by 5%.

Figure 5C:
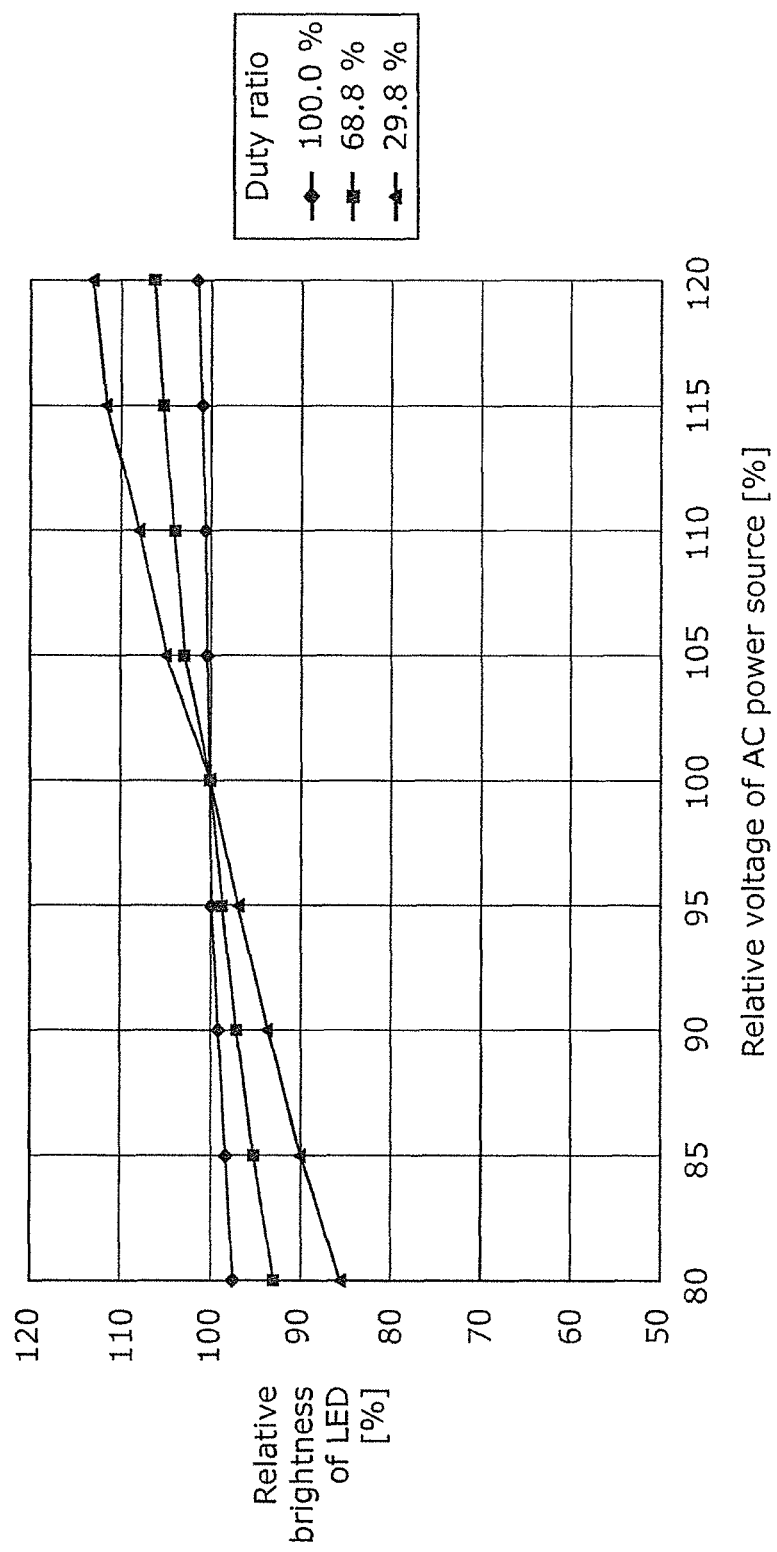
FIG. 5C is a diagram showing the power supply voltage dependency of the lighting device when the time constant of LPF is 564 µs.

FIG. 5C is a diagram showing the power supply voltage dependency of the lighting device 1 when the time constant of the LPF 30 is 56.4 µs in the present embodiment. The figure shows a result of measurement conducted under the same conditions as FIG. 5A, except that the time constant of the LPF 30 is different. As can be seen from the measurement result shown in FIG. 5C, when the time constant of the LPF 30 is 56.4 µs, the dependency of the illumination changes on the power supply voltage is not to any significant degree while the power supply voltage dependence increases greater than the measurement result shown in FIG. 5B. According to the experiment using the test subject, the test subject did not notice the changes in brightness of the LEDs 3 even when the power supply voltage instantly varies by 5%.

Figure 5D:
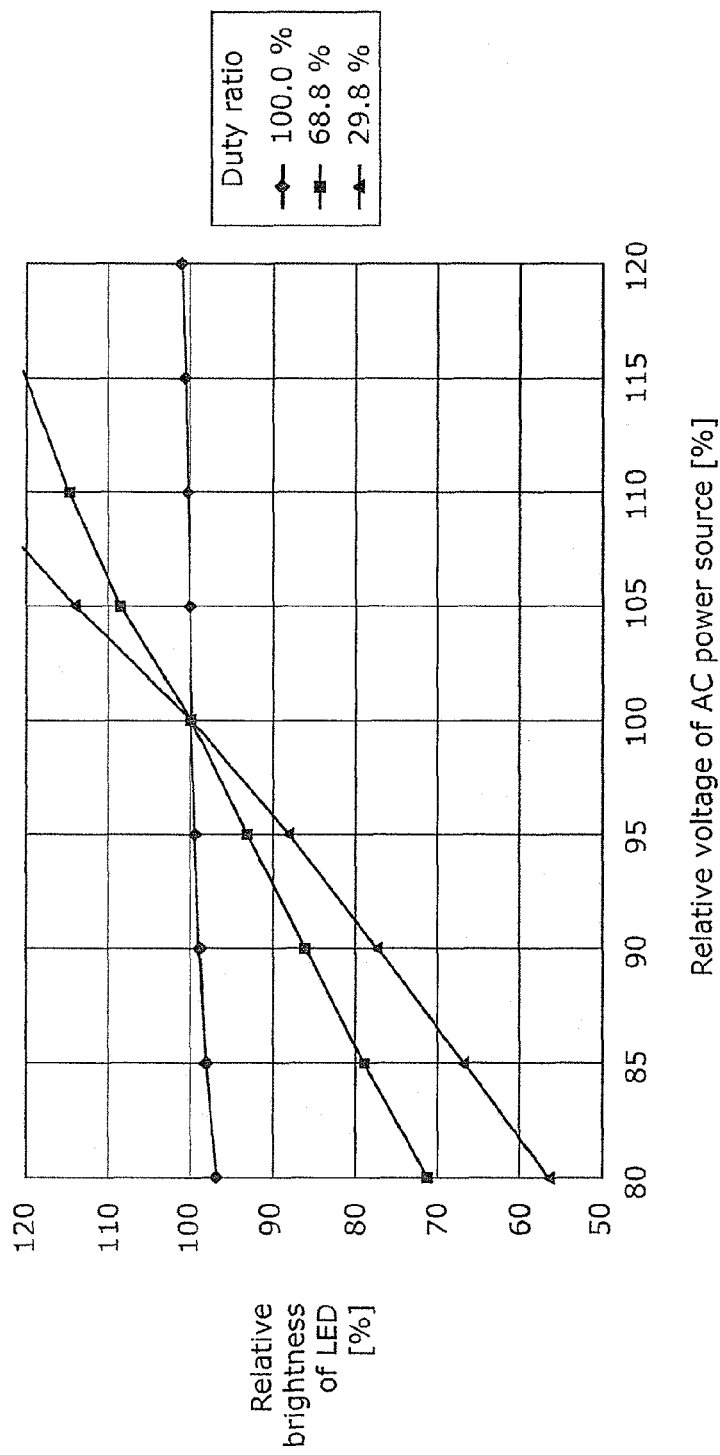
FIG. 5D is a diagram showing the power supply voltage dependency of the lighting device when the time constant of LPF is 264 µs.

FIG. 5D is a diagram showing the power supply voltage dependency of the lighting device 1 when the time constant of the LPF 30 is 264 µs in the present embodiment. The figure shows a result of measurement conducted under the same conditions as FIG. 5A, except that the time constant of the LPF 30 is different. As can be seen from the measurement result shown in FIG. 5D, when the time constant of the LPF 30 is 264 µs, the power supply voltage dependence increases greater than the measurement result shown in FIG. 5C, and the illumination changes depends heavily on the power supply voltage. According to the experiment using the test subject, when the duty ratio of the PWM signal is 68.8% or below, the test subject was able to notice the changes in brightness of the LEDs 3 when the power supply voltage instantly varies by 5%.

It can be seen from the measurement results shown in FIG. 5A to FIG. 5D described above that the lighting device 1 according to the present embodiment can reduce the power supply voltage dependence to a negligible level by setting the time constant of the LPF 30 to 56.4 µs or below.

Summarizing the above measurement result with respect to the sound emission shown in FIG. 4 and the measurement results with respect to the power supply voltage dependency shown in FIG. 5A to FIG. 5D leads to the following. Specifically, in the lighting device 1 according to the present embodiment, the time constant that can reduce both the sound emission and the power supply voltage dependence to negligible levels is 26.4 µs and 56.4 µs of the four values (zero, 26.4 µs, 56.4 µs, 264 µs) of the time constant of the LPF 30.

It is considered that the relationship between the time constant of the LPF 30, the volume of sound emission, and the power supply voltage dependence as described above is obtained due to the following reasons:

(1) Relationship between the time constant of the LPF 30 and the volume of sound emission As the time constant of the LPF 30 increases, the extent to which the PWM signal generated by the dimmer control circuit 35 is smoothed increases, and thereby a smoother PWM signal is inputted to the drive circuit 20. The drive circuit 20 has, as on-time characteristics, a distinct linear region (a region in which the pulse height of the PWM signal and on-time are positively correlated with each other, i.e., a region in which the pulse height of the PWM signal is greater than the first threshold V1 and less than the second threshold V2) as shown in FIG. 2. This increases low frequency components of the current flowing thorough the choke coil 11 driven by the drive circuit 20 like an envelope in "Coil current" of FIG. 3. It is conceived that sound components at a high frequency (here, 4.37 kHz), which is easily audible to humans, is suppressed as a result.

Thus, the greater the time constant of the LPF 30 is, the more the volume of sound emission from the choke coil 11 is reduced.

(2) Relationship between the time constant of the LPF 30 and the power supply voltage dependence As the time constant of the LPF 30 increases, the extent to which the PWM signal generated by the dimmer control circuit 35 is smoothed increases, and thereby a smoother PWM signal is inputted to the drive circuit 20. However, the drive circuit 20 has, as on-time characteristics, non-linear characteristics including the distinct linear region as shown in FIG. 2 and the saturation region (a region in which on-time is constant independent of the pulse height of the PWM signal, i.e., a region in which the pulse height of the PWM signal is greater than or equal to the second threshold V2). Thus, as the time constant of the LPF 30 increases, the amplitude (swing, i.e., AC components) of the smoothed PWM signal decreases, thereby the PWM signal becoming closer to a DC signal. In other words, in each signal interval defined by the duty ratio, the percentage of the first time period in which the pulse height is greater than the first threshold V1 and less than the second threshold V2 exceeds the percentage of the second time period in which the pulse height is greater than or equal to the second threshold V2. As a result, a time for which the drive circuit 20 operates in the linear region in on-time characteristics increases.

However, there is dependency between the pulse height of the PWM signal and on-time in the linear region in on-time characteristics of the drive circuit 20. Thus, the DC voltage generated by the AC/DC converter 5 varies as the voltage of the AC power source 2 varies, which affects the operation of circuit blocks (the dimmer control circuit 35 and the drive circuit 20) in a control system operating using the DC voltage as a power source. As a result, the dependency of the lighting device 1 on the voltage of the AC power source 2 increases when the drive circuit 20 is in operation in the linear region.

On the other hand, on-time is constant independently of the pulse height of the PWM signal in the saturation region in on-time characteristics of the drive circuit 20. Thus, even when the DC voltage generated by the AC/DC converter 5 varies due to the variations in the voltage of the AC power source 2, if the variations in the DC voltage are within a given range, the drive circuit 20 can perform, without being affected by the DC voltage, burst driving while keeping the constant on-time. As a result, insofar as the drive circuit 20 is in operation in the saturation region, on-time, i.e., the current flowing through the LEDs 3 is hardly dependent on the voltage of the AC power source 2.

From the above, it is conceived that as the time constant of the LPF 30 increases, the drive circuit 20 operates longer in the linear region than operating in the saturation region, and thus, the power supply voltage dependence increases. When the time constant of the LPF 30 is made significantly large, the smoothed PWM signal approaches a DC signal. This case is the technology employed in PTL 1 and the power supply voltage dependence is significantly large.

Thus, as the time constant of the LPF 30 increases, the power supply voltage dependence increases. Therefore, to reduce the power supply voltage dependence, desirably, the time constant of the LPF 30 is a constant value (56.4 µs in the present embodiment) or below.

As described above, according to the lighting device 1 of the present embodiment, the smoothed PWM signal is inputted to the drive circuit 20, and the drive circuit 20 operates in the linear region and also in the saturation region. This achieves the lighting device 1 which has reduced power supply voltage dependence and suppressed sound emission, as compared to conventional.

In the present embodiment, the LPF 30 is the 1st order low pass filter including the resistance 31 and the capacitor 32. The configuration of the LPF 30, however, is not limited thereto, and as a modification thereof, the LPF 30 may be a 2nd or higher order low pass filter including a coil and a capacitor, or may be an active low pass filter using an operational amplifier.

Figure 6:
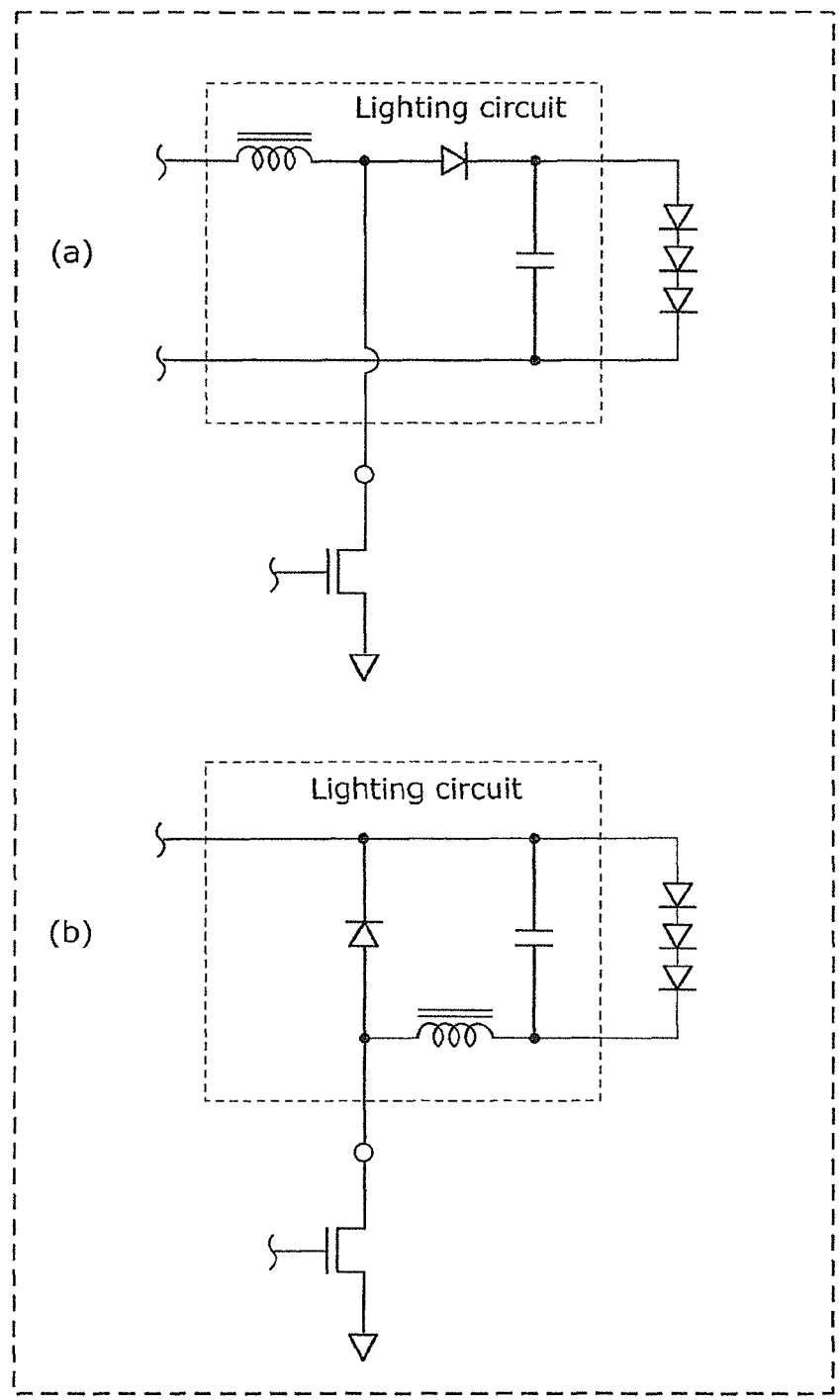
FIG. 6 is a circuit diagram of various chopper circuits according to a modification of the embodiment of the present invention.

Moreover, in the present embodiment, the choke coil 11 and the diode 12 included in the lighting circuit 10, and the switching element 25 included in the drive circuit 20 form a chopper circuit. The configuration of the chopper circuit, however, is not limited thereto, and as a modification thereof, the chopper circuit may be any of various chopper circuits (step-up chopper circuit, step-down chopper circuit, step-up and step-down chopper circuit) shown in FIG. 6.

Figure 7:
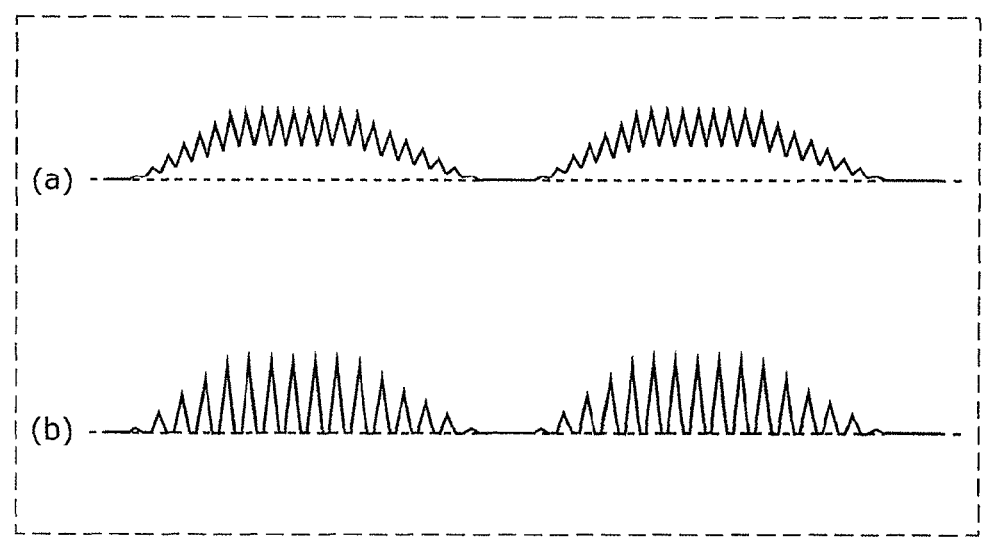
FIG. 7 is a diagram showing various modifications of a mode of a current flowing through a choke coil included in the lighting device according to the present invention.

Moreover, in the present embodiment, the current flowing through the choke coil 11 runs in the critical mode. However, a mode in which the current flows through the choke coil 11 may be, as a modification, a continuous mode shown in (a) of FIG. 7 or a discontinuous mode shown in (b) of FIG. 7. The continuous mode is a mode in which the switching element 25 turns on again and a current starts flowing through the choke coil 11 before the current flowing through the choke coil 11 is zero (i.e., the regenerative current is zero) in the burst period. The discontinuous mode is a mode in which after the current flowing through the choke coil 11 is zero (i.e., the regenerative current is zero) and the above state continues for a time period, and then the switching element 25 turns on again and a current starts flowing through the choke coil 11 in the burst period.

Sound Emission Prevention Method

Next, an embodiment of the sound emission prevention method according to the present invention will be described.

Figure 8:
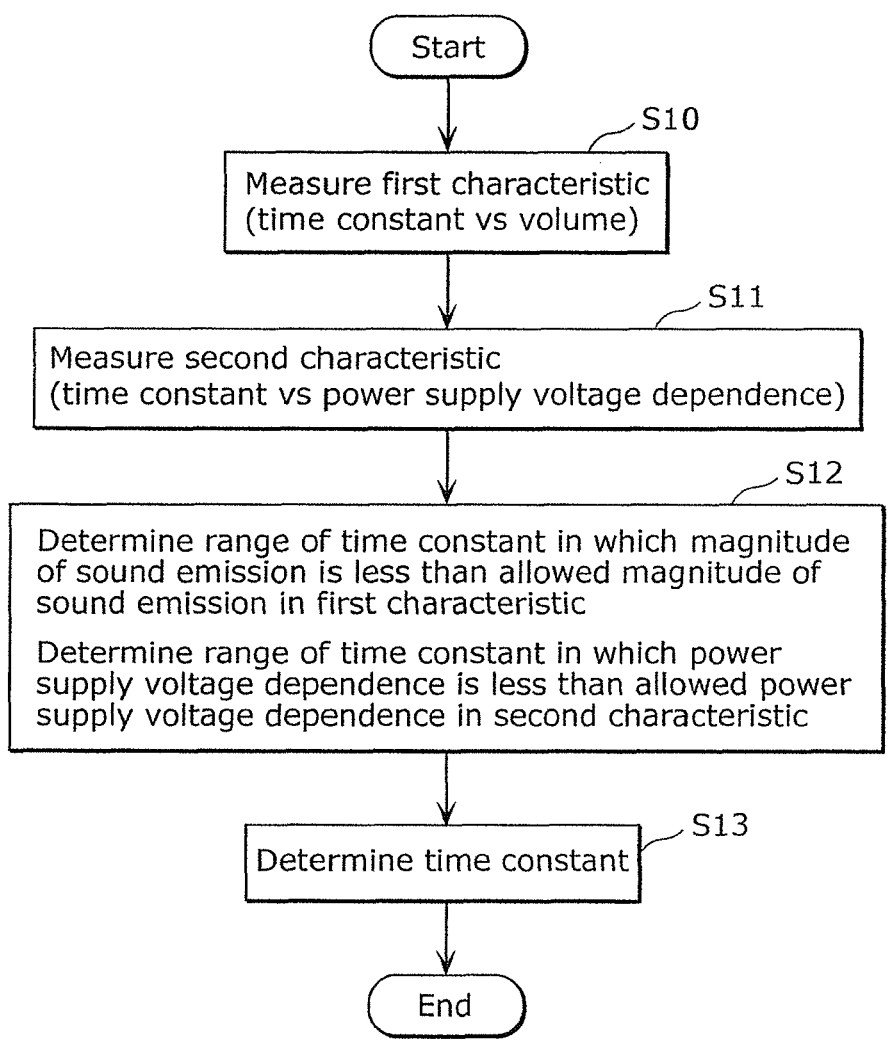
FIG. 8 is a flowchart illustrating the procedure of a sound emission prevention method according to the embodiment of the present invention.

FIG. 8 is a flowchart showing the procedure of the sound emission prevention method according to the embodiment of the present invention. In other words, the procedure of a method for preventing the sound emission from the lighting device which performs the dimmer control on the solid state light-emitting device according to the PWM signal is shown. Specifically, details of the procedure (the time constant determination step) of determining the time constant of the LPF 30 included in the lighting device 1 according to the above embodiment is shown.

First, a first characteristic which is a relationship between the time constant of the LPF 30 and the magnitude of sound emission from the choke coil 11 is determined (i.e., measured) (S10). Specifically, the time constant of the LPF 30 is sequentially set to a plurality of values while the PWM signal having a constant duty ratio (for example, 50%) is being outputted from the dimmer control circuit 35, and the volume of sound emission from the choke coil 11 at each time constant is measured. Then, the relationship between the time constant of the LPF 30 and the volume of sound emission as shown in FIG. 4 is plotted.

Next, the second characteristic which is a relationship between the time constant of the LPF 30 and the power supply voltage dependence (here, the rate of change of the brightness of the LEDs 3 to the variations in the voltage of the AC power source 2) is determined (i.e., measured) (S11). Specifically, the time constant of the LPF 30 is sequentially set to a plurality of values and the power supply voltage dependence at each time constant is measured. For the measurement of the power supply voltage dependence, the PWM signal having a plurality of duty ratios is sequentially outputted from the dimmer control circuit 35, and the luminance of the LEDs 3 when the voltage of the AC power source 2 is varied is measured with respect to the PWM signal at each duty ratio. Then, the relationship between the time constant of the LPF 30 and the power supply voltage dependence as shown in FIG. 5A to FIG. 5D is plotted.

Last, the time constant is determined in which the magnitude of the sound emission is less than a specified magnitude of sound emission in the above first characteristic and the power supply voltage dependence is less than a specified power supply voltage dependence in the above second characteristic (S12, S13). Specifically, in the first characteristic obtained in step S10, a range of the time constant in which the sound emission is less than the specified (allowed) magnitude of sound emission is determined (S12). Furthermore, in the second characteristic obtained in step S11, a range of the time constant in which the power supply voltage dependence is less than the specified (allowed) power supply voltage dependence is determined (S12). Then, a time constant which satisfies both the determined ranges is selected and determined as the time constant of the LPF 30 (S13).

According to the above procedure, the time constant of the LPF 30 which can reduce the volume of sound emission from the choke coil 11 and reduce the power supply voltage dependence can be determined.

While the above flowchart shows the details of the step of determining the time constant, the following procedure is of a method for designing the LPF 30, and, in its turn, may be of a method for designing (manufacturing) the lighting device 1 or a method for designing (manufacturing) a lighting fixture which includes the lighting device 1.

The determination of the first characteristic (S10) and the determination of the second characteristic (S11) may be performed in reversed order or in parallel. Likewise, in step S12, either one of the determination of the time constant in the allowed range of the volume of sound emission and the determination of the time constant in the allowed range of the power supply voltage dependence may be performed prior to the other or in parallel.

Lighting Fixture

Next, an embodiment of a lighting fixture according to the present invention will be described.

The lighting fixture according to the present embodiment includes the lighting device according to any of the above described embodiment and the modification.

Figure 9:
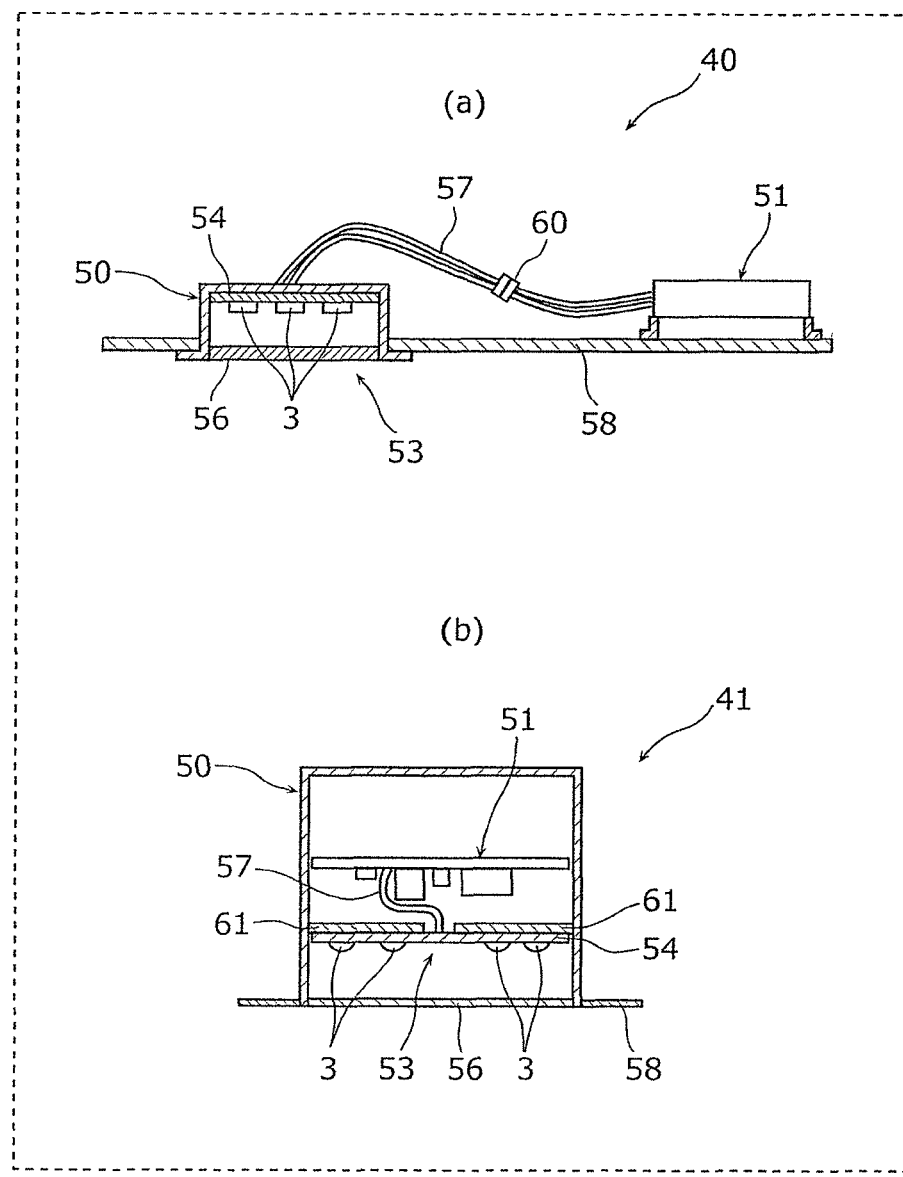
FIG. 9 is a diagram showing the configuration example of a lighting fixture according to the embodiment of the present invention.

Part (a) of FIG. 9 is a diagram showing an example of the lighting fixture according to the present embodiment, that is, the configuration of a lighting fixture 40 having a power source of a separate type in which a lighting device 51 is disposed separately from a light source unit 53. The lighting fixture 40 includes the lighting device 51, the light source unit 53, and a lead wire 57 connecting between the lighting device 51 and the light source unit 53. Here, a fixture body 50 accommodating the light source unit 53 is shown recessed into a ceiling 58. It should be noted that expressions "top" and "bottom" in the following description mean the upward direction and the downward direction in FIG. 9, respectively.

The fixture body 50 is made of, for example, a metal such as aluminum die casting, and formed in a bottomed-cylindrical shape having an opening bottom end. The light source unit 53 which includes a plurality (three in the figure) of LEDs 3 and a board 54 having the LEDs 3 mounted thereon is disposed on the inner top surface of the fixture body 50. The LEDs 3 are disposed in a manner that light is emitted therefrom downwardly so that light is outputted from the bottom end of the fixture body 50 to outer space. Also, a light-transmitting plate 56 for diffusing light from the LEDs 3 is disposed in the opening bottom end of the fixture body 50. The lighting device 51 is disposed on the back surface (top surface) of the ceiling 58, located separately from the fixture body 50. The lighting device 51 and the light source unit 53 are wired by the lead wire 57 via a connector 60.

The lighting device 51 accommodates the lighting device according to any of the above embodiment and the modification thereof.

Part (b) of FIG. 9 is a diagram showing another example of the lighting fixture according to the present embodiment, that is, the configuration of a lighting fixture 41 of a power source-integrated type having the lighting device 51 and the light source unit 53 incorporated in the fixture body 50.

In the configuration, a heat dissipation plate 61 formed of an aluminum plate or a copper plate is disposed on the top surface of the board 54, in contact with the fixture body 50. This allows heat generated by the LEDs 3 to be released to outside via the heat dissipation plate 61 and the fixture body 50.

According to the lighting fixture of the present embodiment as described above, the lighting device according to the above embodiment is employed. Thus, the power supply voltage dependence is reduced and the sound emission is suppressed as compared to conventional.

While the components included in the lighting fixture according to the present embodiment include the LEDs 3 and the board 54 having the LEDs 3 mounted thereon, the lighting fixture according to the present invention is not limited to such a configuration. The lighting fixture according to the present invention may include at least either one of the LEDs and the board having the LEDs mounted thereon.

Bulb Lamp

Next, a bulb lamp will be described as an embodiment of a lamp according to the present invention.

Figure 10A:
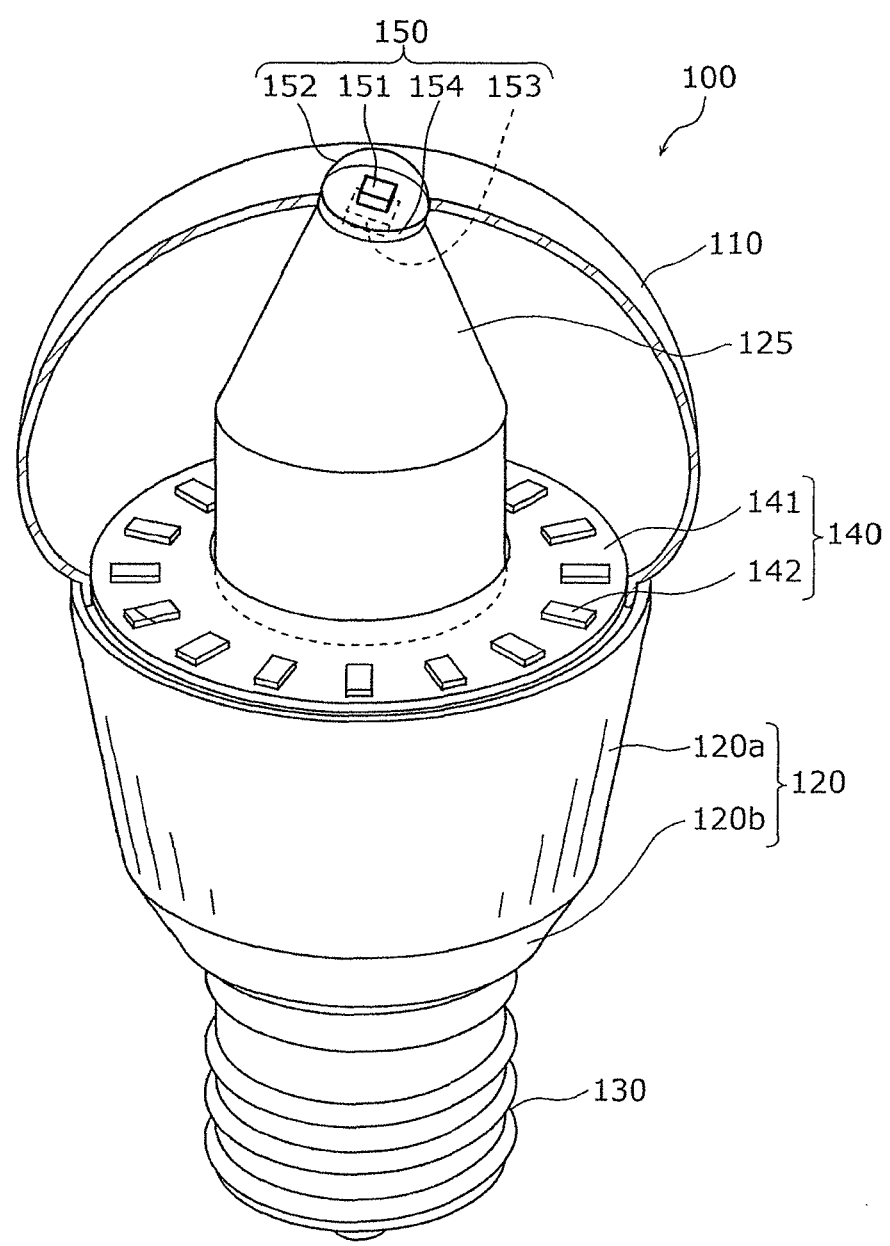
FIG. 10A is a perspective view of a bulb lamp according to the embodiment of the present invention.
Figure 10B:
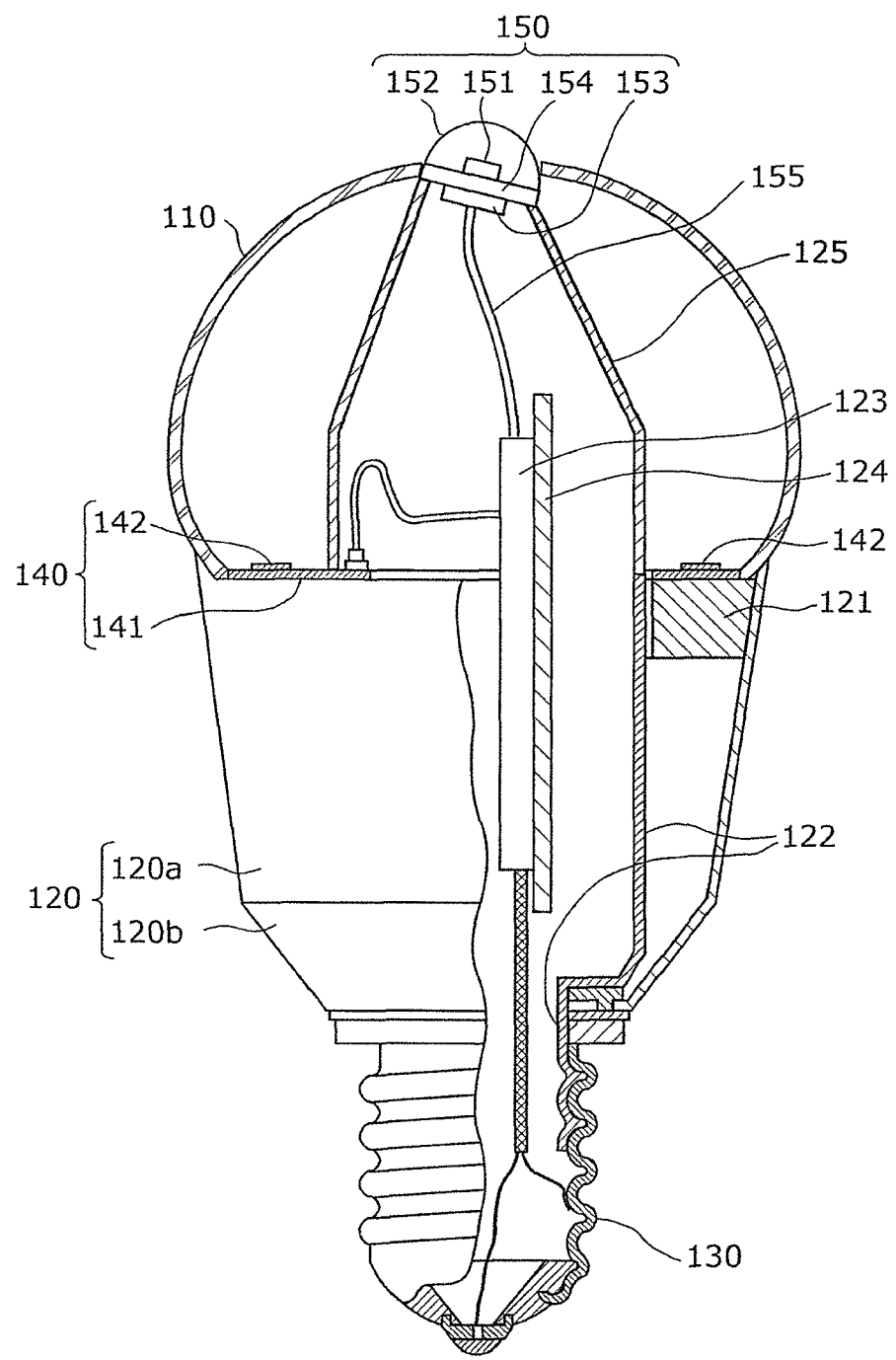
FIG. 10B is a side view, partially broken away, of the bulb lamp shown in FIG. 10A.

A bulb lamp according to the present embodiment includes the solid state light-emitting device and the lighting device which turns on the solid state light-emitting device according to the above embodiment and modification. FIG. 10A is a perspective view of a bulb lamp 100 according to the present embodiment. FIG. 10B is a side view, partially broken away, of the bulb lamp 100 shown in FIG. 10A.

The bulb lamp 100 mainly includes, as shown in FIG. 10A, a globe 110, a housing 120, a base 130, a semiconductor light emitting module 140, and a sensor 150.

The globe 110 is a hemisphere-shaped translucent cover for radiating, to outside the lamp, light emitted from the semiconductor light emitting module 140.

The housing 120 includes a main body 120a disposed on the side of the globe 110, and a proximal end 120b disposed on the side of the base 130. Moreover, the housing 120 holds therein a base 121 holding the semiconductor light emitting module 140, and a circuit holder 122 holding a circuit unit 123. More specifically, the housing 120 holds the semiconductor light emitting module 140 so that main outgoing directions of LEDs 142 described below are directed at the globe 110.

The circuit unit 123 includes the lighting device according to the above embodiment for turning on the LEDs 142, and is formed of various electronic parts (not shown) mounted on a circuit board 124. The circuit unit 123 is accommodated within the circuit holder 122 and a cap member 125. The cap member 125 has a hollow, truncated cone shape, and the opening large diameter end thereof is connected to the circuit holder 122. The cap member 125 holds the sensor 150 on the outer wall surface of a small diameter end.

The base 130 is a power receiving unit for receiving AC power at two contacts, and is mounted to a socket (not shown) of the lighting fixture.

The semiconductor light emitting module 140 includes a mounting board 141 and the LEDs 142 mounted on the mounting board 141. The mounting board 141 is in a substantially annular shape having a substantially circular opening in the middle thereof, and has the LEDs 142 mounted on the top surface.

The sensor 150 is, typically, what is called an occupancy sensor which detects presence and absence of a person near (an emission range of) the bulb lamp 100. The sensor 150 includes a sensing element 151, a lens 152, a control circuit 153, and a mounting board 154. The sensor 150 according to the present embodiment is held on the small diameter end of the cap member 125 so as to be located on a lamp axis J.

The sensing element 151 is an element which detects a detection object (in this example, a person), and detects far infrared emitted by human body. The lens 152 is in a hemisphere shape and light transmissive, and disposed covering the sensing element 151. The lens 152 condenses ambient light (in this example, far infrared emitted from outside toward the sensor 150) to the sensing element 151. In other words, the lens 152 determines a range of detection (angle of detection) of the sensor 150.

The control circuit 153 is connected to the circuit unit 123 by a wire 155, and notifies the circuit unit 123 of a result of detection by the sensing element 151 through the wire 155. The mounting board 154 holds the sensing element 151 and the control circuit 153. Specifically, the mounting board 154 may hold the sensing element 151 on one main surface and the control circuit 153 on the other main surface, electrically connecting the sensing element 151 and the control circuit 153 through a through hole (not shown). The mounting board 154 is fit into the opening of the lens 152, having the sensing element 151 directed to the lens 152.

The bulb lamp 100 which includes the sensor 150 having the above configuration operates as follows, for example. First, when the bulb lamp 100 turns on and a person enters a range of detection of the sensor 150, the sensing element 151 detects far infrared emitted from the person. Next, the control circuit 153 notifies the circuit unit 123 that the sensing element 151 has detected the far infrared (i.e., the person). The circuit unit 123 which has obtained the notification from the control circuit 153 supplies power to the semiconductor light emitting module 140. This causes the LEDs 142 to emit light (the bulb lamp 100 turns on)

On the other hand, when the bulb lamp 100 turns on and a state in which the sensing element 151 is not detecting far infrared continues for a predetermined time period, the circuit unit 123 stops supplying power to the semiconductor light emitting module 140. This turns off the bulb lamp 100.

Thus, by turning on the bulb lamp 100 only when a person is detected and turning off the bulb lamp 100 when a person is not present, the bulb lamp 100 is prevented from being left turned on, and, at the same time, the bulb lamp 100 which can reduce power consumption can be obtained. In addition, the sensor 150 is mounted on the bulb lamp 100 rather than on the lighting fixture. Therefore, even an existing (no sensor) lighting fixture can readily implement the lighting control by the occupancy sensor.

According to the lamp of the present embodiment, the above-described lighting device according to the present embodiment is employed and thus, as compared to conventional, the power supply voltage dependence is reduced and the sound emission is suppressed.

Figure 10C:
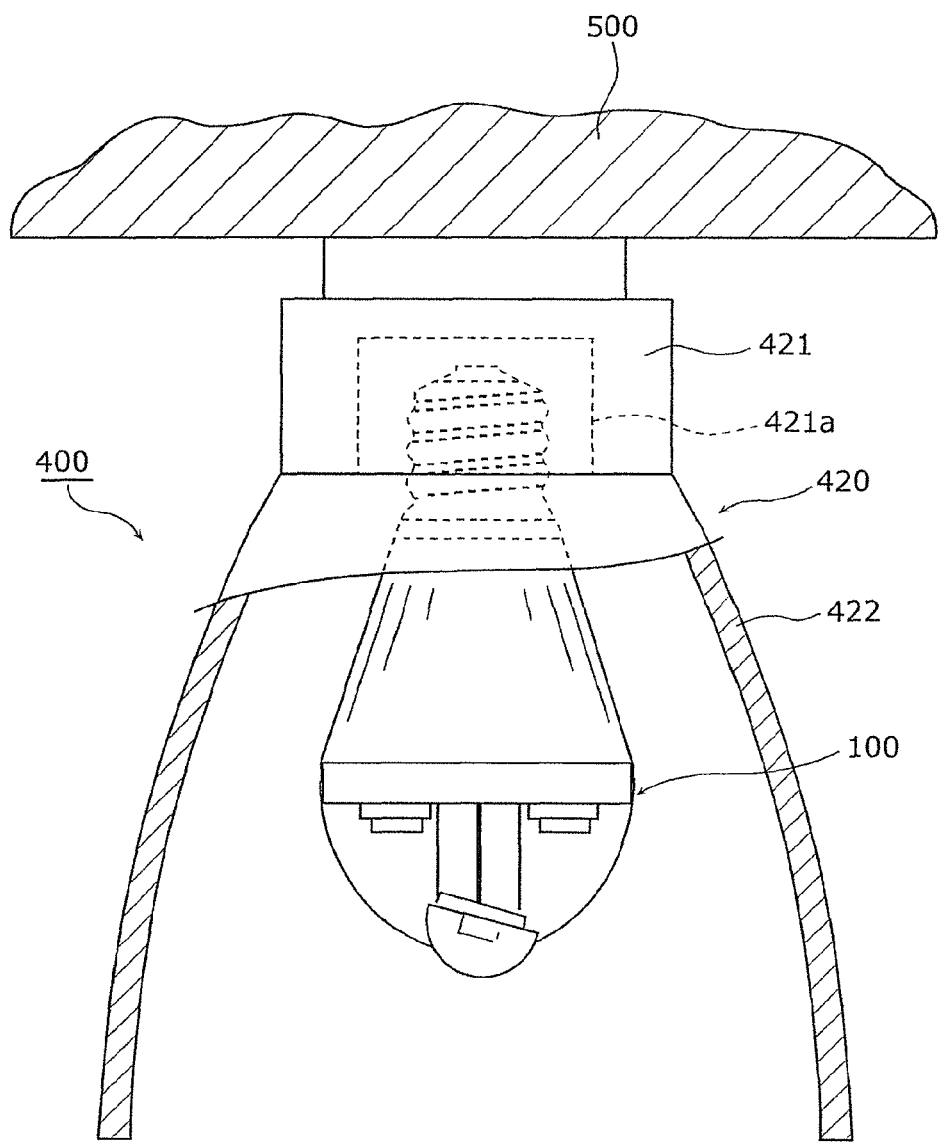
FIG. 10C is a schematic sectional view of a lighting system which includes the bulb lamp shown in FIG. 10A and FIG. 10B.

Such a bulb lamp 100 may be implemented in a lighting system (or the lighting fixture). FIG. 10C is a schematic sectional view of a lighting system 400 which includes the bulb lamp 100 shown in FIG. 10A and FIG. 10B.

The lighting system 400 according to an embodiment of the present invention is, as shown in FIG. 10C, installed onto a ceiling 500 in a room, and includes the bulb lamp 100 according to an embodiment of the present invention and a light fixture 420. The light fixture 420 is for turning off and on the bulb lamp 100, including a device body 421 mounted to the ceiling 500, and a lamp cover 422 which covers the bulb lamp 100. The device body 421 includes a socket 421a. The base 130 of the bulb lamp 100 is threadedly engaged to the socket 421a. The bulb lamp 100 is supplied with power via the socket 421a.

While the bulb lamp 100 according to the present embodiment includes the sensor 150, the lamp according to the present invention is not limited to such embodiment, and may not include a sensor.

Disc-shaped Lamp

Next, a disc-shaped lamp will be described with reference to an embodiment of the lamp according to the present invention.

Figure 11A:
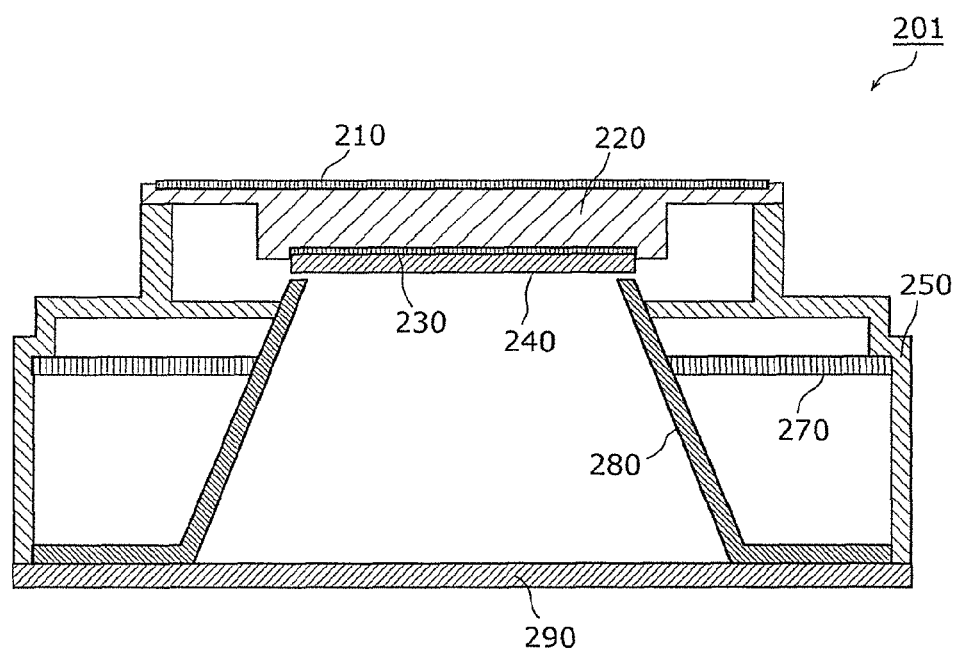
FIG. 11A is a sectional view of a disc-shaped lamp, across the vertical direction, according to the embodiment of the present invention.
Figure 11B:
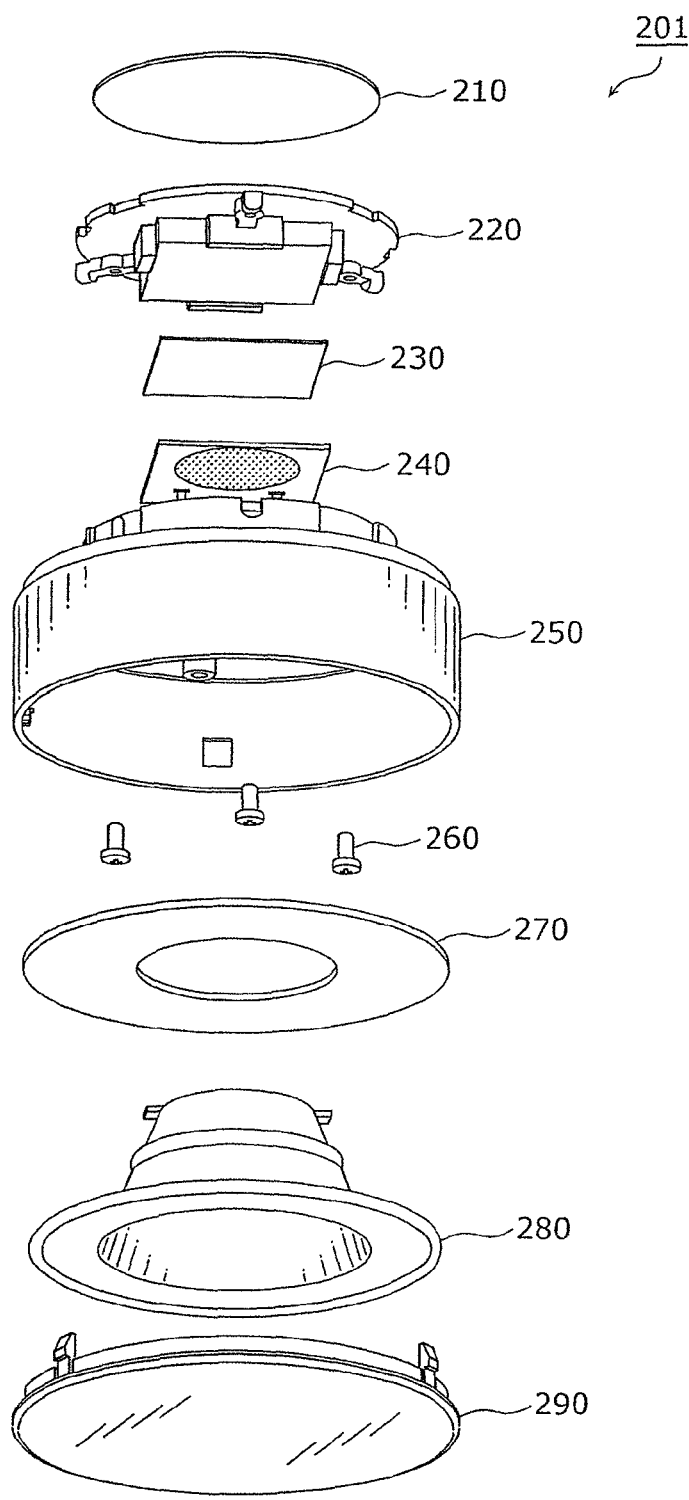
FIG. 11B is an exploited view of the disc-shaped lamp shown in FIG. 11A.
Figure 12:
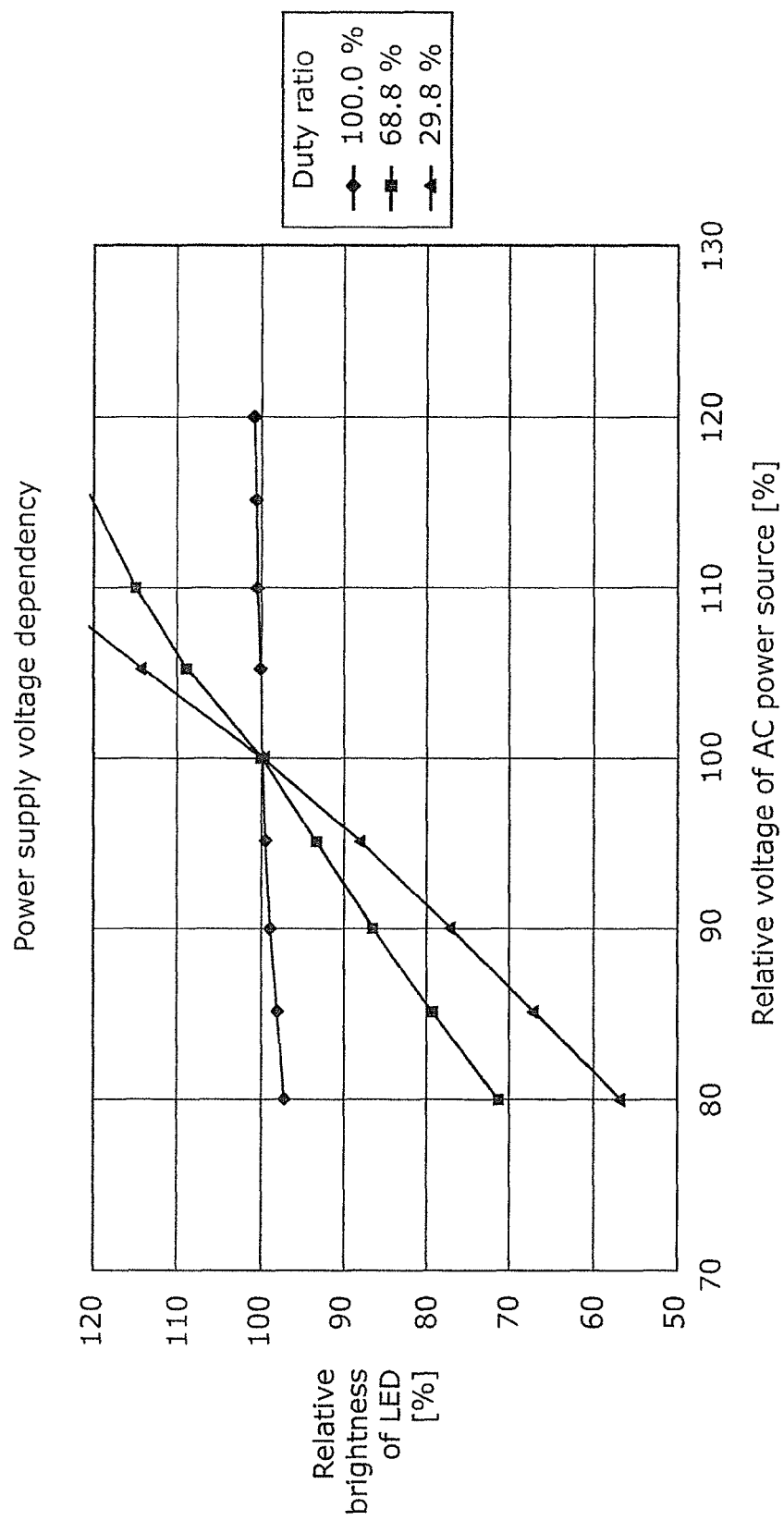
FIG. 12 is a graph showing the power supply voltage dependency of a lighting device using a conventional sound emission prevention circuit.

The disc-shaped lamp according to the present embodiment includes a solid state light-emitting device, and the above-described lighting device according to the embodiment and the modification for turning on the solid state light-emitting device. FIG. 11A and FIG. 11B are diagrams each showing the configuration of a disc-shaped lamp 201 according to the present embodiment. Specifically, FIG. 11A is a cross-sectional schematic view of the disc-shaped lamp 201 cut in the top-down direction. FIG. 11B is an exploited view of the disc-shaped lamp 201.

The disc-shaped lamp 201 is an LED lamp the overall shape of which is a disc shape or flat-plate shape. Specifically, the disc-shaped lamp 201 is an LED lamp which includes a GH76p base. More specifically, the disc-shaped lamp 201 has, for example, the outer diameter of 50 mm to 100 mm and the height of 30 mm to 50 mm. When the disc-shaped lamp 201 is a 20 W LED lamp, the outer diameter is 90 mm and the height is 45 mm, for example.

FIG. 11A and FIG. 11B illustrate the disc-shaped lamp 201 so that the side from which light is emitted (hereinafter, referred to as a light output side) is shown facing downwardly. Hereinafter, in the present embodiment, the top (upward side) and the bottom (downward side) are defined based on a state in which the lamp is disposed having the light output side facing downwardly.

The disc-shaped lamp 201 includes a thermally conductive sheet 210, a support 220, a fill member 230, a mounting board 240, a housing 250, set screws 260, a circuit board 270, a reflector 280, and a translucent cover 290.

The thermally conductive sheet 210 releases, toward the lighting fixture, heat transferred from the mounting board 240 via the support 220.

The support 220 is a member connected to the lighting fixture. Specifically, the support 220 has, for example, the GH76p base structure formed on the top surface thereof, and is secured attached to the lighting fixture. Also, the support 220 is a platform to which the mounting board 240 is attached, and disposed on the opposite side of the light output side of the mounting board 240.

The fill member 230 is a member disposed between the support 220 and the mounting board 240, filling a space between the support 220 and the mounting board 240. In other words, the fill member 230 is a member made of a soft material forming, when sandwiched between the support 220 and the mounting board 240, a shape corresponding to the shape of the space between the support 220 and the mounting board 240. Here, preferably, the fill member 230 is a thermally conductive sheet thermally connecting the mounting board 240 and the support 220. More preferably, the fill member 230 is an insulating sheet insulating the mounting board 240 and the support 220. Specifically, the fill member 230 is a sheet made of a rubber or a resin, and, for example, a silicon sheet or an acrylic sheet.

The mounting board 240 is a board having LEDs mounted thereon. The mounting board 240 is, preferably, made of a material having high thermal conductivity, for example, an alumina substrate made of alumina.

The housing 250 is in a discoidal shape and covers the light output side of the disc-shaped lamp 201. Specifically, the housing 250 has the top portion secured to the support 220 by the set screws 260, and the bottom portion attached having the translucent cover 290 thereto. The fill member 230, the mounting board 240, the circuit board 270, and the reflector 280 are disposed inside the housing 250.

The circuit board 270 is the lighting device according to the above embodiment for causing an LED chip mounted on the mounting board 240 to emit light. The circuit board 270 is a board in a disc shape (a toroidal shape) having a circular opening, and disposed inside the housing 250 and outside the reflector 280. A circuit element (electronic part) mounted on the circuit board 270 is disposed in a space inside the housing 250 and outside the reflector 280.

The reflector 280 is an optical member disposed on the light output side of the mounting board 240 and reflects light emitted from a light emitting portion. Specifically, the reflector 280 downwardly reflects outgoing light emitted from the light emitting portion disposed on the mounting board 240. Specifically, the reflector 280 is disposed downwardly of the mounting board 240 and inside the housing 250, and has a cylindrical shaped portion formed the internal diameter of which gradually enlarging downwardly.

The translucent cover 290 is a bottomed member having a discoidal-shape and attached to the bottom surface of the housing 250 to protect members disposed inside the housing 250. The translucent cover 290 is secured to the bottom surface of the housing 250 by adhesive, or a plurality of rivets or screws. The translucent cover 290 is formed of a synthetic resin material having high light transmittance, such as polycarbonate, so that the outgoing light emitted from the light emitting portion on the mounting board 240 transmits therethrough.

As described above, according to the disc-shaped lamp 201 of the embodiment of the present invention, the housing 250 includes a securement unit 55 which secures the mounting board 240 to the support 220 by sandwiching the mounting board 240 between the support 220 and the housing 250. Thus, since the mounting board 240 can be secured to the support 220 by being sandwiched between the housing 250 and the support 220, a special member for securing the mounting board 240 to the support 220 is not necessary. Thus, the LED substrate can be secured to the support by a simplified configuration.

Moreover, since there is no any special member for securing the mounting board 240 to the support 220 necessary, material costs and assembly costs can be reduced, thereby reducing manufacturing cost.

According to the disc-shaped lamp of the present embodiment as described above, the lighting device according to the above embodiment is employed. Thus, the power supply voltage dependence is reduced and the sound emission is suppressed as compared to conventional.

Similarly to the bulb lamp, such a disc-shaped lamp 201 may be implemented in the lighting system (or the lighting fixture). Such a lighting system includes the disc-shaped lamp 201 according to one embodiment of the present invention and the light fixture, and is used installed onto the ceiling in a room, for example. The light fixture includes, for example, a fixture body mounted to the ceiling, and a lamp cover which covers the disc-shaped lamp 201.

While the bulb lamp and the disc-shaped lamp have been described as specific examples of the lamp according to the present invention, the lamp according to the present invention is not limited to the embodiments. The lamp according to the present invention may be in any shape insofar as including the lighting device and the solid state light-emitting device according to the present invention.

While the lighting device, the lighting fixture, and the sound emission prevention method according to the present invention have been described with reference to the embodiment and the modification, the present invention is not limited to the embodiment and the modification. Various modifications to the embodiments and modifications that may be conceived by those skilled in the art and other embodiments constructed in any combination of constituent elements according to different embodiments and modifications are included in the scope of one or more aspects of the present invention, without departing from the essence of the present invention.

For example, while the lighting circuit 10 includes the smoothing capacitor 13 in the present embodiment, the capacitor 13 is not necessary. This is because even when the LEDs 3 are AC driven due to the lack of the capacitor 13, humans do not notice a flicker when the LEDs 3 are AC driven at the drive frequency.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present invention is applicable as LED lighting fixtures which are recessed into a ceiling, such as lighting devices for turning on solid state light-emitting devices such as light-emitting diodes and organic EL elements, lighting fixtures and lamps which include the lighting devices, and methods (i.e., a design method) for preventing sound emission from the lighting device and the lighting fixture.

The invention claimed is:
1. A lighting device for turning on a solid state light-emitting device at brightness according to a dimming signal, the lighting device comprising:
 a lighting circuit to which a direct-current (DC) voltage is inputted, including a coil for chopping the inputted DC voltage and a diode for regenerating energy stored in the coil;
 a drive circuit including an input terminal to which a pulse width modulation (PWM) signal is inputted, and a switching element for turning on and off a current flowing through the coil by repeatedly turning on and off in a burst period which is a period corresponding to a duty ratio indicated by the PWM signal inputted to the input terminal;
 a dimmer control circuit for generating a PWM signal which has a duty ratio corresponding to the dimming signal; and
 a low pass filter for smoothing the PWM signal generated by the dimmer control circuit, and outputting the smoothed PWM signal to the input terminal of the drive circuit,
 wherein the PWM signal generated by the dimmer control circuit has a pulse height including a first threshold and a second threshold greater than the first threshold,
 the smoothed PWM signal includes a first time period in which the pulse height is greater than the first threshold and less than the second threshold, and a second time period in which the pulse height is greater than or equal to the second threshold, and
 the drive circuit increases on-time as the pulse height of the smoothed PWM signal increases in the first time period, and makes the on-time constant in the second time period, the on-time being a period for which the switching element is on when the switching element turns on and off once in the burst period.

2. The lighting device according to claim 1,
wherein the PWM signal includes a first logical state indicative of a Low state and a second logical state indicative of a High state, and is repeated at a constant frequency, and
the smoothed PWM signal has the second time period ⅓ or longer than a time period for which the second logical state continues.

3. The lighting device according to claim 1, wherein the drive circuit turns the switching element on and off so that an envelope of a waveform of the current flowing through the coil in the burst period forms a shape corresponding to a waveform of the smoothed PWM signal inputted to the input terminal.

4. A lighting fixture comprising the lighting device according to claim 1.

5. A lamp comprising a solid state light-emitting device and the lighting device according to claim 1 for turning on the solid state light-emitting device.

6. A lighting fixture comprising the lamp according to claim 5.

\* \* \* \* \*